US010266271B2

(12) United States Patent
Udriste et al.

(10) Patent No.: US 10,266,271 B2
(45) Date of Patent: Apr. 23, 2019

(54) AIRCRAFT SEAT WITH SEGMENTED SEATBACK FOR ACHIEVING IN-BED LOUNGE SITTING POSITION

(71) Applicant: B/E Aerospace, Inc., Wellington, FL (US)

(72) Inventors: Daniel Udriste, Coral Springs, FL (US); Javier Valdes De La Garza, Miami, FL (US); Michael Beroth, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 246 days.

(21) Appl. No.: 15/282,352

(22) Filed: Sep. 30, 2016

(65) Prior Publication Data

US 2017/0015423 A1     Jan. 19, 2017

Related U.S. Application Data

(63) Continuation-in-part of application No. 14/672,914, filed on Mar. 30, 2015, now Pat. No. 9,944,396.
(Continued)

(51) Int. Cl.
*B64D 11/06* (2006.01)
*B60N 2/85* (2018.01)
(Continued)

(52) U.S. Cl.
CPC ........ *B64D 11/0641* (2014.12); *B60N 2/2222* (2013.01); *B60N 2/34* (2013.01);
(Continued)

(58) Field of Classification Search
CPC ............ B64D 11/0641; B64D 11/0642; B64D 11/0643; B64D 11/0646; B60N 2/853;
(Continued)

(56) References Cited

U.S. PATENT DOCUMENTS

| 5,098,158 A | 3/1992 | Palarski |
| 6,059,364 A * | 5/2000 | Dryburgh ............. A47C 1/0352 297/354.13 X |

(Continued)

FOREIGN PATENT DOCUMENTS

FR     2 859 175 A1     3/2005

*Primary Examiner* — Anthony D Barfield
(74) *Attorney, Agent, or Firm* — Clements Bernard Walker PLLC

(57) ABSTRACT

In a preferred embodiment, an adjustable aircraft passenger seat includes a seat bottom; a legrest moveably connected to the seat bottom that articulates between a legrest vertical and a legrest horizontal positions; a lower seatback moveably connected to the seat bottom to be articulated between a lower seatback vertical and a lower seatback horizontal positions; and an upper seatback moveably connected to the lower seatback to be articulated between an upper seatback vertical and an upper seatback horizontal positions. The articulation of the legrest, the articulation of the lower seat back, and the articulation of the upper seatback may be configured to articulate the adjustable aircraft passenger seat from an upright sitting to a horizontal sleeping position, through an in-bed lounge sitting position.

16 Claims, 34 Drawing Sheets

Related U.S. Application Data

(60) Provisional application No. 62/401,014, filed on Sep. 28, 2016, provisional application No. 61/971,828, filed on Mar. 28, 2014.

(51) Int. Cl.

| | | |
|---|---|---|
| *B60N 2/40* | (2006.01) | |
| *B60N 2/853* | (2018.01) | |
| *B60N 2/90* | (2018.01) | |
| *B60N 2/885* | (2018.01) | |
| *B60N 2/865* | (2018.01) | |
| *B60N 2/75* | (2018.01) | |
| *B60N 2/22* | (2006.01) | |
| *B60N 2/46* | (2006.01) | |
| *B60N 2/48* | (2006.01) | |
| *B60N 2/64* | (2006.01) | |
| *B60N 2/34* | (2006.01) | |
| *B60N 2/44* | (2006.01) | |

(52) U.S. Cl.
CPC ........... *B60N 2/4495* (2013.01); *B60N 2/464* (2013.01); *B60N 2/4852* (2013.01); *B60N 2/4864* (2013.01); *B60N 2/4882* (2013.01); *B60N 2/643* (2013.01); *B60N 2/77* (2018.02); *B60N 2/853* (2018.02); *B60N 2/865* (2018.02); *B60N 2/885* (2018.02); *B60N 2/995* (2018.02); *B64D 11/0642* (2014.12); *B64D 11/0643* (2014.12); *B64D 11/0646* (2014.12)

(58) Field of Classification Search
CPC ........ B60N 2/865; B60N 2/885; B60N 2/995; B60N 2/77; B60N 2/2222; B60N 2/34; B60N 2/4495; B60N 2/464; B60N 2/4852; B60N 2/4864; B60N 2/4882; B60N 2/643
USPC ..................................................... 297/354.13
See application file for complete search history.

(56) References Cited

U.S. PATENT DOCUMENTS

| | | | |
|---|---|---|---|
| 7,802,846 B2 * | 9/2010 | Bellefleur | A47C 1/0244 |
| | | | 297/284.1 X |
| 7,997,531 B2 | 8/2011 | Bettell | |
| 8,172,321 B2 | 5/2012 | Hankinson et al. | |
| 8,303,036 B2 | 11/2012 | Hankinson et al. | |
| 2004/0256894 A1 | 12/2004 | McManus et al. | |
| 2015/0008708 A1 * | 1/2015 | Erhel | B64D 11/0646 |
| | | | 297/354.13 X |

* cited by examiner

AIRCRAFT SEAT WITH SEGMENTED SEATBACK FOR ACHIEVING IN-BED LOUNGE SITTING POSITION

CROSS REFERENCES TO RELATED APPLICATIONS

This application is a continuation-in-part of and claims priority to U.S. patent application Ser. No. 14/672,914, entitled "Aircraft Seat with Segmented Seatback for Achieving In-Bed Lounge Sitting Position" and filed Mar. 30, 2015, which claims priority from U.S. Provisional Application No. 61/971,828, filed Mar. 28, 2014, and also claims priority to U.S. Provisional Application No. 62/401,014 entitled "Passenger Seat Backrest Tilt" and filed Sep. 28, 2016, the contents of each of which are incorporated by reference in their entirety.

BACKGROUND

The present disclosure relates to generally to the field of aircraft seat design, and more particularly, to an aircraft seat having a segmented seatback divided into a lower seatback, an upper seat back, and a headrest that move independently as the seat reclines to achieve an in bed lounge sitting position, among other sitting positions.

Aircraft seat manufacturers are continuously looking to improve seat comfort and adjustability to enhance the flying experience, particularly in premium seating classes. The most luxurious types of seating classes include individual passenger suites, commonly referred to as "mini-suites," which typically include lie-flat capable seats, premium media equipment and electronics, enhanced lighting, desks and other amenities.

Conventional lie-flat capable seats are configured to selectively adjust between an upright sitting position required for taxi, takeoff and landing ("TTOL"), and a sleeping position in which the seatback, seat bottom and legrest together form a flat, horizontal bed. In intermediate sitting positions, while the angle of the seatback and the legrest may be independently adjustable relative to the seat bottom, there is no adjustability in the contour or curvature of the seatback itself. Therefore, certain sitting positions cannot be achieved, for example, a hybrid bed/lounge sitting position in which the legrest and seat bottom are horizontal and the seatback curved upward to provide a comfortable lounge position for reading or watching television.

In addition, these conventional seats may rely on a multitude of articulated elements, e.g. seatback, headrest, or legrest, to increase passenger comfort which may result in difficulty to adjust and find a comfortable position. For example, in these conventional seats each articulated element may have to be independently and successively actuated one by one.

Thus, a lie-flat capable seat solving the above mentioned limitations of comfort and ease of use is desired.

SUMMARY OF ILLUSTRATIVE EMBODIMENTS

In one aspect, the present disclosure relates to providing a passenger seat having a seatback segmented into separate sections configured to adjust independent of one another to provide curvature to the seatback to achieve additional sitting positions.

In another aspect, the present disclosure relates to providing an aircraft passenger seat in which the seatback is segmented into an independently adjustable lower seatback, upper seatback, and headrest.

In another aspect, the present disclosure relates to providing an aircraft passenger seat including a segmented seatback in which the lower seatback is adjustable in angle relative to the seat bottom, and the upper seatback is adjustable in angle relative to the lower seatback.

In another aspect, the present disclosure relates to providing an aircraft passenger seat including a headrest adjustable in height and/or angle relative to an adjacent seatback portion.

In another aspect, the present disclosure relates to providing an adjustable headrest including a center portion positioned between a pair of adjustable side portions, the center portion being adjustable in height and/or angle relative to an adjacent seatback portion and the side portions adjustable in angle relative to the center portion.

In another aspect, the present disclosure relates to providing an adjustable aircraft passenger seat employing multiple actuators, with one actuator dedicated for driving lower seatback movement, another actuator dedicated for driving upper seatback movement relative to the lower seatback, yet another actuator dedicated for driving headrest movement, and yet another actuator dedicated for driving legrest deployment when a legrest is present.

In another aspect, the present disclosure relates to providing an adjustable aircraft passenger seat capable of achieving an in-bed lounge sitting position in which the seat bottom and legrest are generally horizontal, and the seatback is curved to support the upper body and head of a seated passenger in a comfortable sitting-up position for reading and watching television.

In another aspect, the present disclosure relates to provide an adjustable aircraft passenger seat including a seat bottom, a legrest adjustable in angle relative to the seat bottom, a seatback adjustable in angle relative to the seat bottom, the seatback segmented into a lower seatback and an upper seatback, the lower seatback adjustable in angle relative to the seat bottom and the upper seatback adjustable in angle relative to the lower seatback, and a headrest adjustable in height relative to the upper seatback.

In another aspect, the present disclosure relates to the adjustable aircraft passenger seat being adjustable to achieve an upright sitting position for taxi, take-off and landing, and an in-bed lounge sitting position in which the legrest and seat bottom are coplanar, the lower seatback is at an angle to the seat bottom, and the upper seatback is at an angle to the lower seatback.

In another aspect, the present disclosure relates to the seat having a first actuator dedicated for lower seatback movement, a second actuator dedicated for upper seatback movement, a third actuator dedicated for headrest movement, and a fourth actuator dedicated for legrest movement.

In another aspect, the present disclosure relates to the upper seatback being pivotably attached at one end the lower seat back, and the second actuator may be horizontally-oriented on a backside of the upper seatback to drive a rotating gear meshed with an arcuate toothed guide of the lower seatback to move the gear along a length of the arcuate toothed guide to adjust an angle of the upper seatback relative to the lower seatback.

In another aspect, the present disclosure relates to the lower seatback being pivotably attached at one end to the seat bottom, and the first actuator may be vertically-oriented on a backside of the lower seatback to drive pivoting movement of the lower seatback relative to the seat bottom.

In another aspect, the present disclosure relates to the third actuator being vertically-oriented on a backside of the upper seatback and connected to the headrest to drive the headrest toward and apart from the upper seatback.

In another aspect, the present disclosure relates to the headrest including a center portion and side portions adjustable relative to the center portion.

In another aspect, the present disclosure relates to the headrest being arranged to slide along vertically-oriented rails on a backside of the upper seatback to slide the headrest toward and apart from the upper seatback.

In another aspect, the present disclosure relates to the seat including left and right armrests positioned on opposite sides of the seat bottom.

In another aspect, the present disclosure relates to an aircraft passenger suite including a number of privacy walls defining the bounds of the passenger suite, a passenger seat positioned within the passenger suite, and an ottoman positioned directly forward of the passenger seat, the seat including a seat bottom, a legrest adjustable in angle relative to the seat bottom, a seatback adjustable in angle relative to the seat bottom, the seatback segmented into a lower seatback and an upper seatback, the lower seatback adjustable in angle relative to the seat bottom and the upper seatback adjustable in angle relative to the lower seatback, and a headrest adjustable in height relative to the upper seatback.

In another aspect, the present disclosure relates to the passenger seat being adjustable to achieve an upright sitting position for taxi, take-off and landing, and an in-bed lounge sitting position in which the legrest and seat bottom are coplanar, the lower seatback is at an angle to the seat bottom, and the upper seatback is at an angle to the lower seatback.

In another aspect, the present disclosure relates to the ottoman being spaced apart from the passenger seat such that a front of the ottoman aligns with an end of the legrest when deployed to extend seat length.

In another aspect, the present disclosure relates to a aircraft passenger seat having a seat bottom; a legrest moveably connected to the seat bottom that articulates between a legrest vertical position and a legrest horizontal position; a lower seatback moveably connected to the seat bottom to be articulated between a lower seatback vertical position and a lower seatback horizontal position; an upper seatback moveably connected to the lower seatback to be articulated between an upper seatback vertical position and an upper seatback horizontal position; and a headrest moveably connected to the upper seatback to be articulated between a contracted position and a deployed position. The articulation of the legrest, the articulation of the lower seat back, the articulation of the upper seatback, and the articulation of headrest are configured to articulate the adjustable aircraft passenger seat from an upright sitting position to a horizontal sleeping position, through an in-bed lounge sitting position.

In another aspect, the present disclosure relates to an aircraft passenger suite having a multitude of privacy walls defining boundaries of the passenger suite; a passenger seat having: a seat bottom; a legrest moveably connected to the seat bottom that articulates between a legrest vertical position and a legrest horizontal position; a lower seatback moveably connected to the seat bottom to be articulated between a lower seatback vertical position and a lower seatback horizontal position; an upper seatback moveably connected to the lower seatback to be articulated between an upper seatback vertical position and an upper seatback horizontal position; and a headrest moveably connected to the upper seatback to be articulated between a contracted position and a deployed position. The articulation of the legrest, the articulation of the lower seat back, the articulation of the upper seatback, and the articulation of headrest are configured to articulate the adjustable aircraft passenger seat from an upright sitting position to a horizontal sleeping position, through an in-bed lounge sitting position; and an ottoman positioned directly forward of the passenger seat to form a substantially horizontal surface when the legrest is in the legrest horizontal position.

Embodiments can include one or more or any combination of the above features and configurations.

Additional features, aspects and advantages of the innovations will be set forth in the detailed description which follows, and in part will be readily apparent to those skilled in the art from that description or recognized by practicing the invention as described herein. It is to be understood that both the foregoing general description and the following detailed description present various embodiments, and are intended to provide an overview or framework for understanding the nature and character of the invention as it is claimed. The accompanying drawings are included to provide a further understanding various illustrative embodiments of the invention, and are incorporated in and constitute a part of this specification

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where.

DETAILED DESCRIPTION OF ILLUSTRATIVE EMBODIMENTS

The present invention will now be described more fully hereinafter with reference to the accompanying drawings in which exemplary embodiments are shown. However, the invention may be embodied in many different forms and should not be construed as limited to the representative embodiments set forth herein. Like reference numbers refer to like elements throughout the various drawings.

Figure 1:
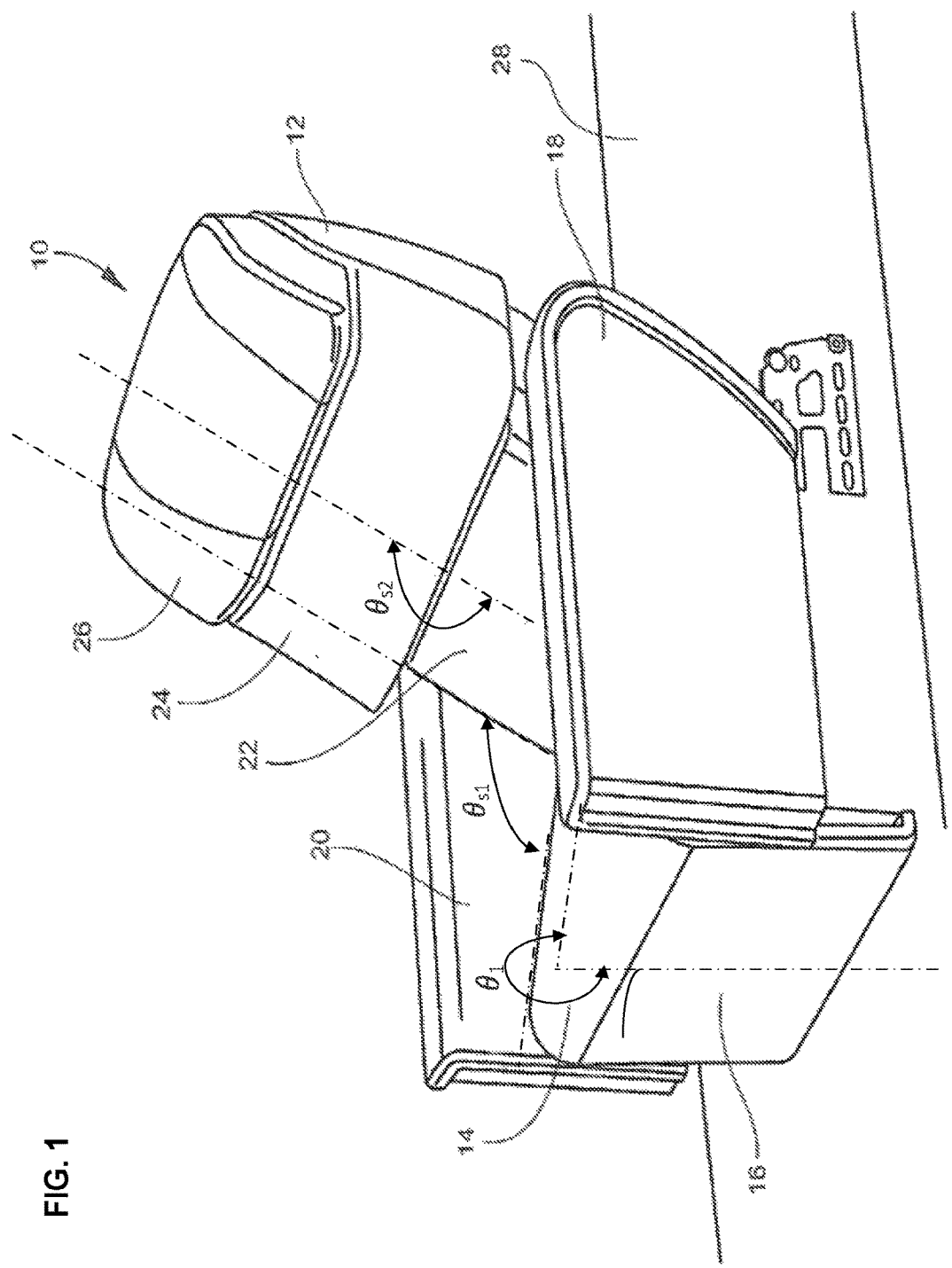
FIG. 1 is a front perspective view of an aircraft passenger seat shown in an upright sitting position, according to certain aspects of the disclosure.
Figure 2:
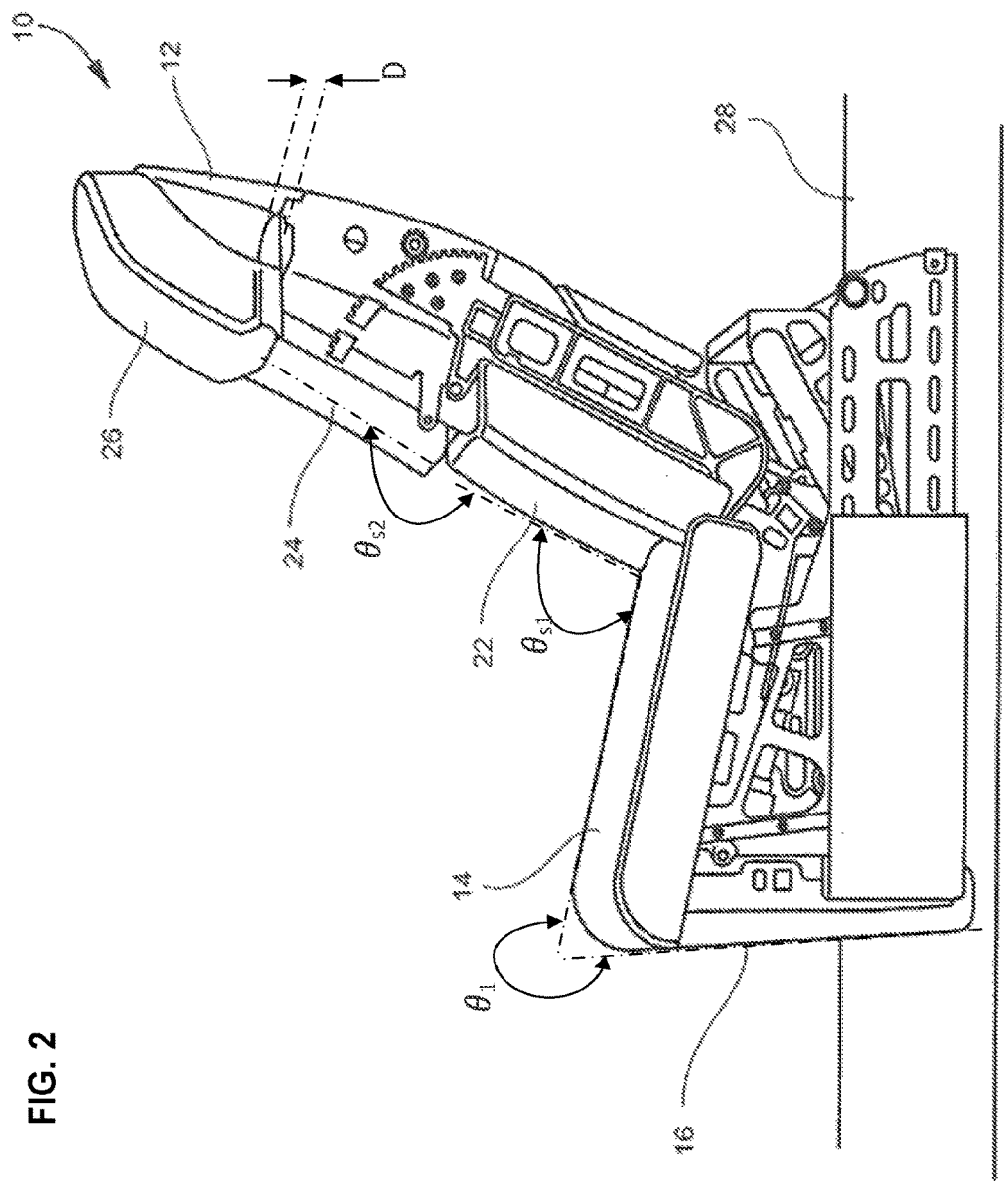
FIG. 2 is a side view of the seat of FIG. 1, according to certain aspects of the disclosure.
Figure 3:
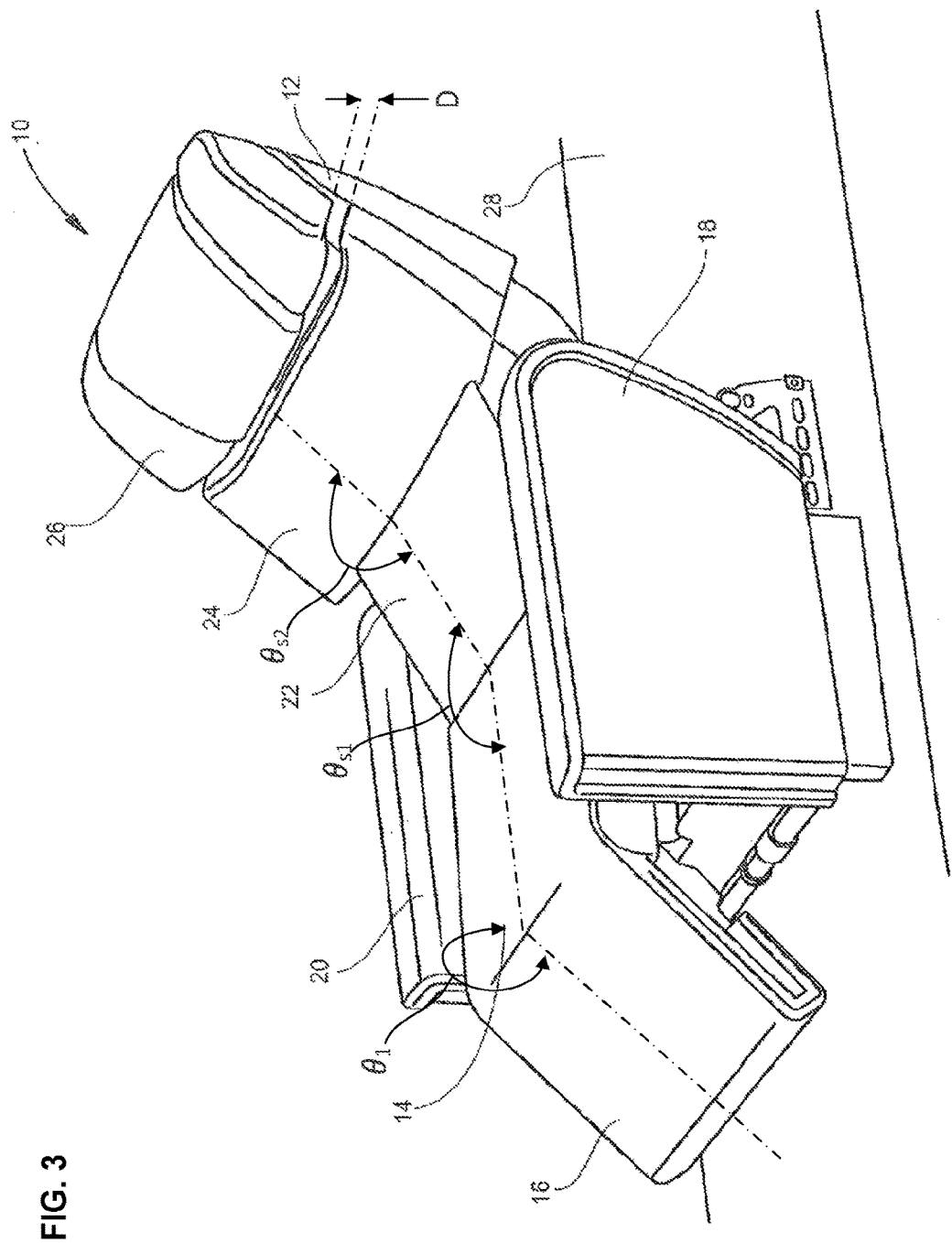
FIG. 3 is a front perspective view of an aircraft passenger-seat shown in a reclined sitting position in which the legrest is partially deployed and the seatback curved, according to certain aspects of the disclosure.
Figure 4:
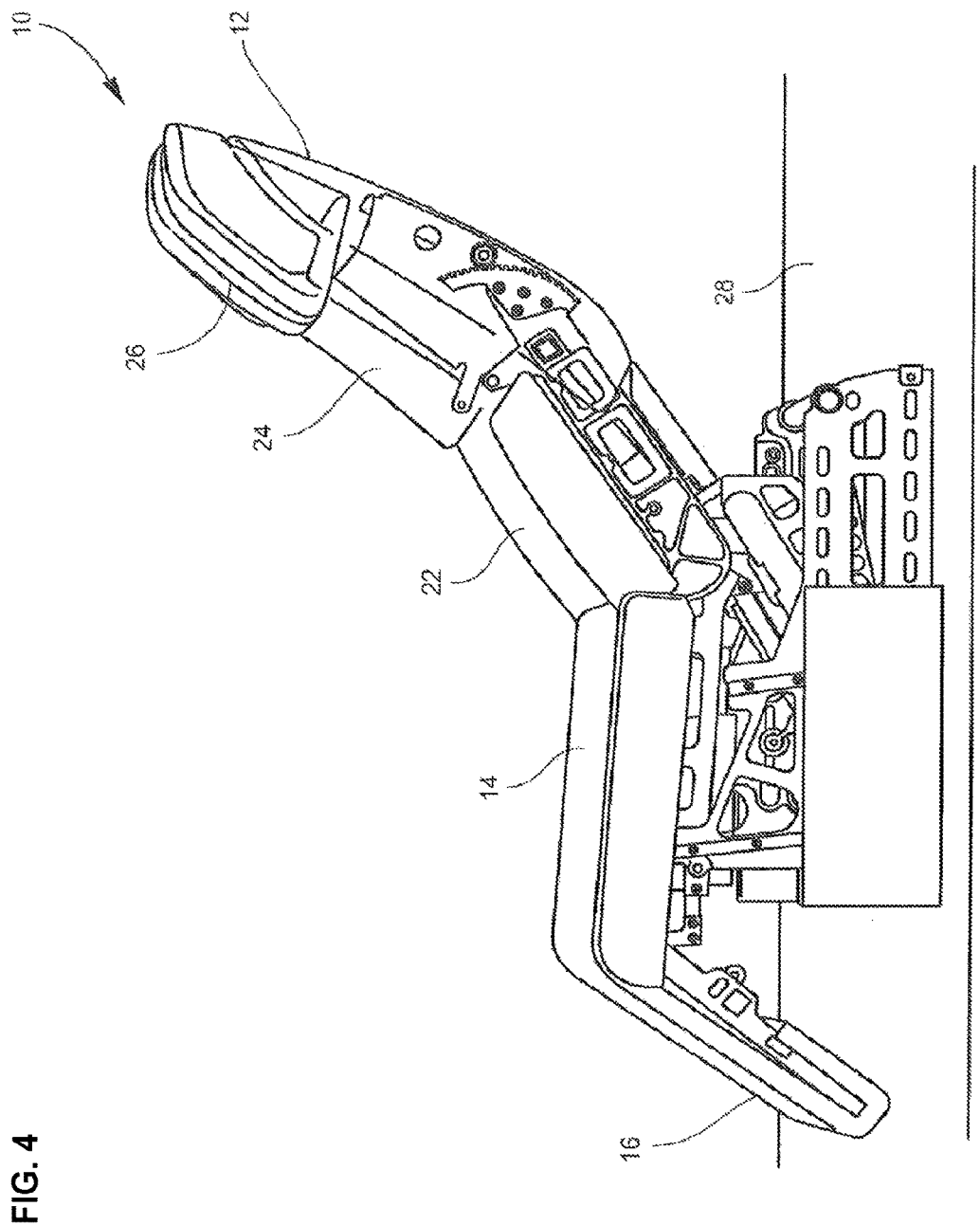
FIG. 4 is a side view of the seat of FIG. 3 in the reclined sitting position, according to certain aspects of the disclosure.
Figure 5:
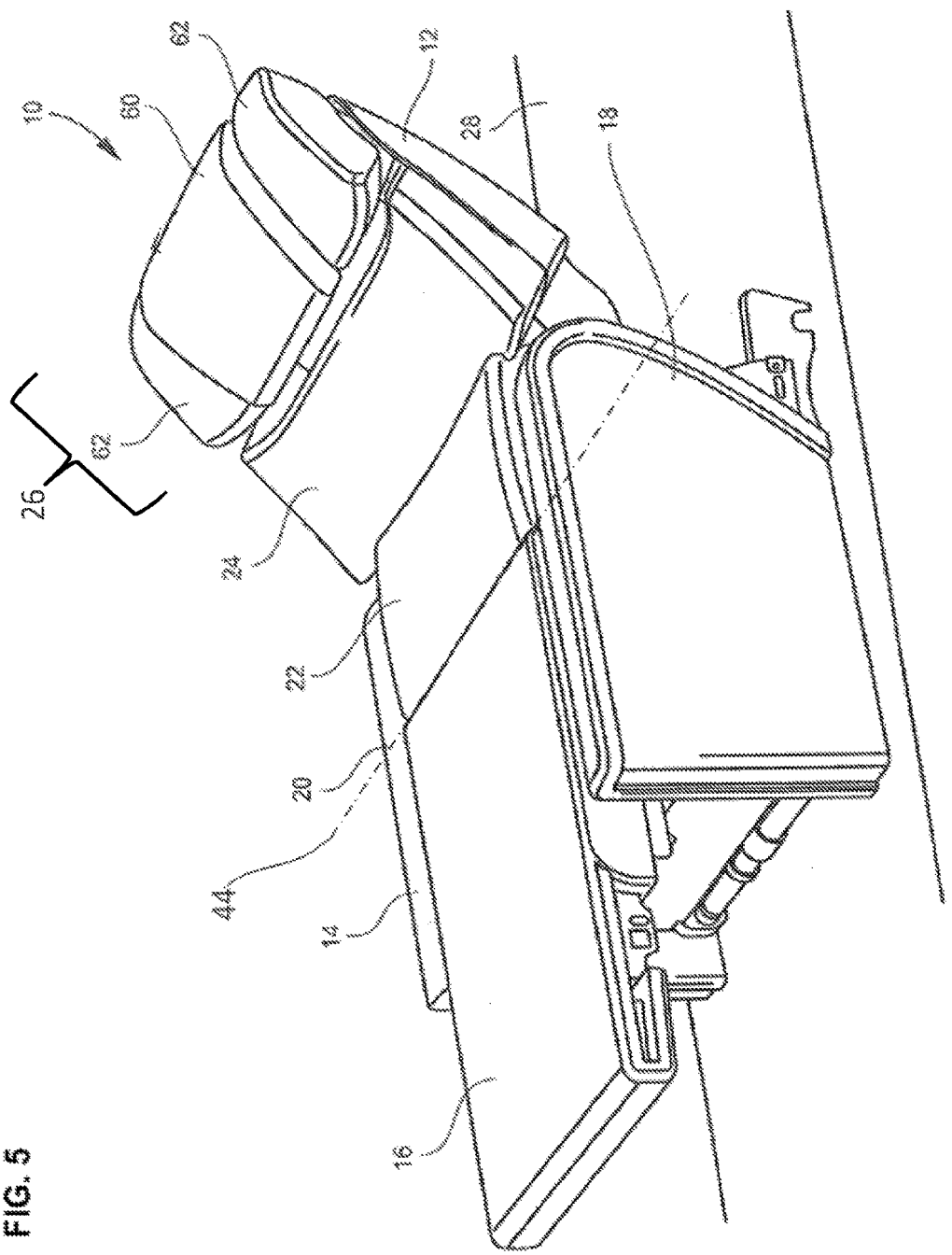
FIG. 5 is a front perspective view of an aircraft passenger seat shown in an in-bed lounge sitting position, according to certain aspects of the disclosure.
Figure 6:
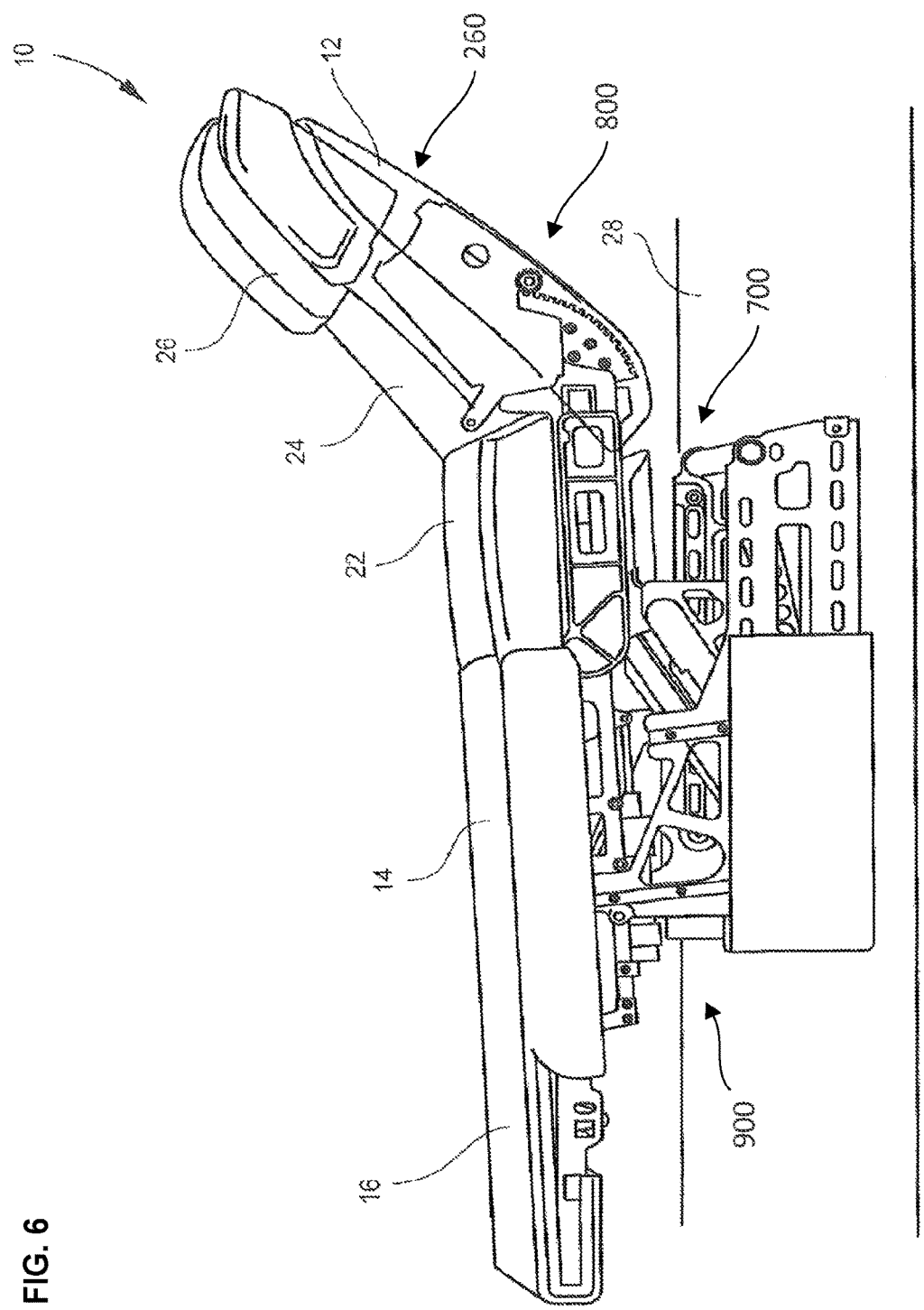
FIG. 6 is a side view of the seat of FIG. 5 in the in-bed lounge sitting position, according to certain aspects of the disclosure.
Figure 7:
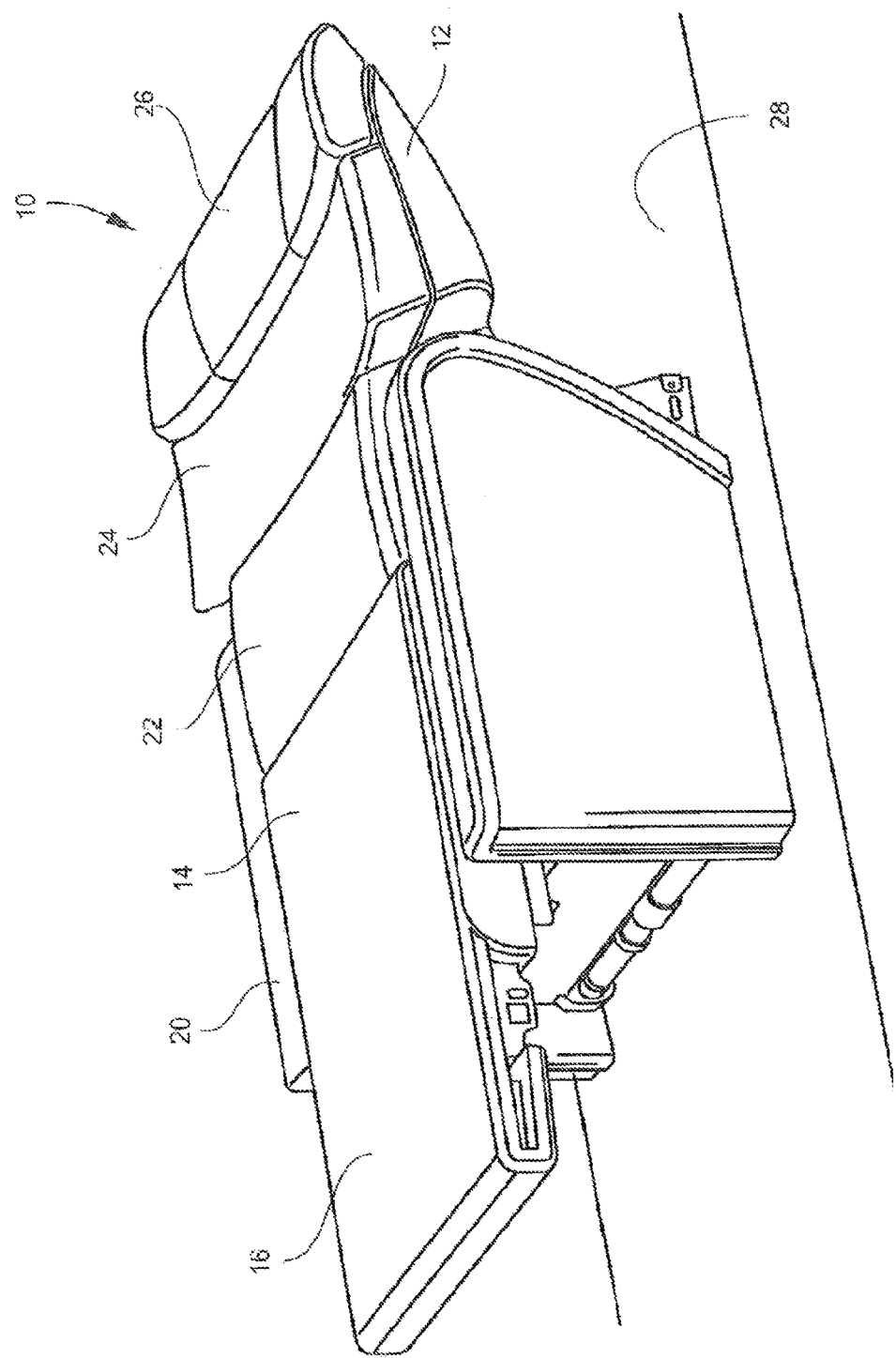
FIG. 7 is a front perspective view of an aircraft passenger seat shown in a horizontal bed position, according to certain aspects of the disclosure.
Figure 8:
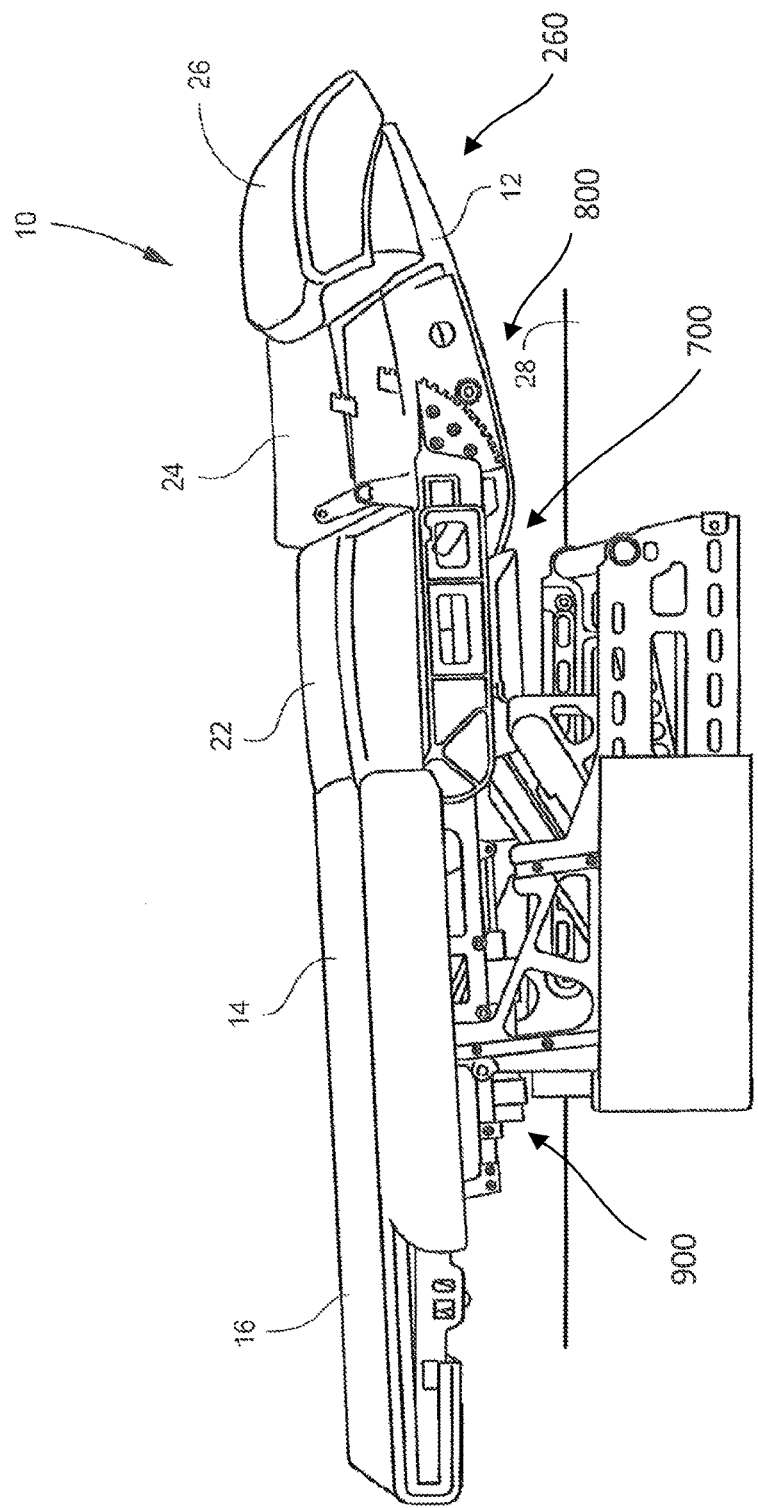
FIG. 8 is a side view of the seat of FIG. 7 in the horizontal position, according to certain aspects of the disclosure.

Referring to FIGS. 1-8, an aircraft seat according to certain embodiments is shown generally at reference numeral 10. The aircraft seat 10 may be configured to selectively adjust between an upright sitting position (e.g., TTOL sitting position) as shown in FIGS. 1 and 2, and a horizontal sleeping position as shown in FIGS. 7 and 8, as well as a number of intermediate sitting and lounge positions as shown in FIGS. 3-6. FIGS. 3 and 4 in particular show the seat 10 in a reclined sitting position with the legrest partially deployed and the seatback reclined and curved to support the upper body and head in a comfortable upright sitting position. FIGS. 5 and 6 in particular show the seat 10 in an "in-bed lounge" sitting position with the legrest deployed to horizontal so as to be coplanar with the seat bottom, and the seatback reclined and curved to support the upper body and head in an upright sitting position comfortable for reading and watching television. The seat 10, in some implementations, steplessly adjustable between the various sitting, lounging and sleeping positions so as to be infinitely adjustable. As described below, for example, the legrest and seatback may be independently adjustable, as well as portions of the seatback and headrest.

The seat 10, in some embodiments, generally includes a seatback 12, seat bottom 14, legrest 16, and left and right armrests 18, 20 positioned on opposite sides of the seat bottom. A single armrest may be shared between laterally adjacent seats, and one armrest may be provided along the wall in the case of a window seat. Seat surfaces that come into contact with the passenger may be cushioned and upholstered for comfort and durability. The back, bottom, sides and other out-of-contact surfaces may be shrouded for aesthetics and to conceal the underlying mechanicals. Shrouds may be constructed from plastics and other durable, lightweight materials.

Referring to FIGS. 1 and 2, respective perspective and side views show the seat 10 in an upright sitting position for TTOL. In the upright sitting position, the seatback 12 is at its steepest angle to the floor 28 (i.e., most vertical), the legrest 16 is stowed substantially vertically against the front of the seat, and the armrests 18, 20 are raised to their highest vertical position from the floor 28. The seatback 12 is segmented or "divided" into an independently adjustable lower seatback 22, upper seatback 24, and headrest 26, which together form the seatback. In the upright sitting position, the lower seatback 22, upper seatback 24, and headrest are aligned generally coplanar such that the seatback is substantially straight or has relatively little curvature.

Referring to FIGS. 3 and 4, respective perspective and side views show the seat 10 in a partially reclined sitting position in which the seatback 12 is at a shallow angle to the floor 28, the legrest 16 is partially raised, and the seat bottom 14 is translated forward and rotated toward horizontal. In some embodiments, the seat bottom is additionally raised such that the armrests 18, 20 are closer to horizontal alignment with the top of the seat bottom 14. The lower seatback 22, upper seatback 24, and headrest 26, which are independently movable, are adjusted to give the seatback 12 a shallow, gradual curve. The partially reclined sitting position may be comfortable for sleeping, watching television or lounging, for example.

Referring to FIGS. 5 and 6, respective perspective and side views show the seat 10 achieving an in-bed lounge sitting position in which the seat bottom 14, legrest 16, and armrests 18, 20 are horizontally aligned to cooperatively form a portion of a bed, and the seatback 12 is curved upward to support the upper body and head in a lounge position. In the in-bed lounge sitting position, the lower seatback 22, upper seatback 24, and headrest 26 are adjusted to provide a more pronounced or steeper curve than the seatback 12 in the partially reclined sitting position shown in FIGS. 3 and 4. The segmentation of the seatback 12 into the lower seatback 22, upper seatback 24, and headrest 26 is most apparent in 5 and 6 as evidenced by the spacing between the respective segments. The in-bed lounge sitting position may be comfortable for sleeping, watching television, lounging, reading, elevating the feet, etc.

Referring to FIGS. 7 and 8, respective perspective and side views show the seat 10 in a flat, horizontal bed in which the seatback 12, seat bottom 14, legrest 16, and armrests 18, 20 are substantially coplanar and horizontal. The lower seatback 22, upper seatback 24, and headrest 26 are adjusted such that the seatback is substantially flat and horizontal. The armrests 18, 20 are at their lowest vertical position relative to the floor when the seat 10 is in the bed position.

Now, referring back to FIGS. 1-8, in some embodiments, the seat 10 can be articulated between the upright sitting position, as illustrated in FIGS. 1-2, and the horizontal sleeping position as illustrated in FIGS. 7-8, to provide a multitude of positions as shown in FIGS. 3-6 and notably the in-bed lounge sitting position, as illustrated in FIGS. 5-6. Furthermore, the articulation of the seat 10 between the upright sitting position and the horizontal sleeping position may be configured to provide better comfort, a more precise adjustment for the multitude of positions, and better usability. For example, the articulation of the seat 10 can be performed by articulating the lower seatback 22 from a lower seatback vertical position to a lower seatback horizontal position, the upper seatback 22 from a upper seatback vertical position to a upper seatback horizontal position, the legrest 16 from a legrest vertical position to a legrest horizontal position, and the headrest 26 from a headrest contracted position to a headrest extended position.

In some implementations, the lower seatback 22 can be articulated between the lower seatback vertical position and the lower seatback horizontal position via a lower seatback actuation system 700, as illustrated in FIGS. 6 and 8, to provide support for a lower body part of the passenger. For example, in the lower seatback vertical position, the lower seatback 22 can be substantially aligned with an upright seating angle from the vertical plane, as illustrated in FIGS. 1-2, while in the lower seatback horizontal position the lower seatback 22 can be substantially aligned with a horizontal plane, as illustrated in FIGS. 7-8. The lower seatback 22 can be articulated between the lower seatback vertical position and the lower seatback horizontal position by adjusting, via the lower seatback actuation system 700, a first seatback angle $\theta_{s1}$ formed between the seat bottom 14 and the lower seatback 22.

In some implementations, the lower seatback 22 and/or the lower seatback actuation system 700 can be configured to provide a range of adjustment sufficiently large to support the lower body part of the passenger with comfort regardless of positions taken by the passenger on the seat 10, e.g. sitting, lying, lounging, or the like. For example, from the lower seatback vertical position to the lower seatback horizontal position the first seatback angle $\theta_{s1}$ can be adjusted, via the lower seatback actuation system 700, from 80° to 200°, and preferably from 90° to 180°, in order to move the lower seatback 22 from being substantially vertical to being substantially horizontal in an aftward direction. Similarly, from the lower seatback horizontal position to the lower seatback vertical position the first seatback angle $\theta_{s1}$ can be adjusted from 200° to 80°, and preferably from 180° to 90°, in order to move the lower seatback 22 from being substantially horizontal to being substantially vertical in a forward direction.

In some embodiments, the lower seatback 22 and/or the lower seatback actuation system 700 can be configured to provide an adjustment with precision. For example, the first seatback angle $\theta_{s1}$ can be adjusted from the lower seatback vertical position to the lower seatback horizontal position, and vice-versa, by a first seatback incremental step $\delta\theta_{s1}$ sufficiently small to not be noticeable by a passenger using the seat 10. For example, the first seatback incremental step $\delta\theta_{s1}$ can be between 0.0001° and 10°, and preferably between 0.001° and 1°.

In some embodiments, the upper seatback 24 can be articulated between the upper seatback vertical position and the upper seatback horizontal position via an upper seatback actuation system 800, as illustrated in FIGS. 6 and 8, to provide support for an upper body part of the passenger regardless of positions taken by the passenger on the seat 10. For example, in the upper seatback vertical position, the upper seatback 24 is substantially aligned with an upright seating angle from the vertical plane, as illustrated in FIGS. 1-2, while in the lower seatback horizontal position the lower seatback 22 is substantially aligned with a horizontal plane, as illustrated in FIGS. 7-8.

The upper seatback 24 can be articulated between the upper seatback vertical position and the upper seatback horizontal position, for example, by adjusting, via the upper seatback actuation system 800, a second seatback angle $\theta_{s2}$ formed between the lower seatback 22 and the upper seatback 24.

In some implementations, the upper seatback 24 and/or the upper seatback actuation system 800 can be configured to provide a range of adjustment sufficiently large to support the upper body part of the passenger with comfort for a multitude of passenger morphologies. For example, from the upper seatback vertical position to the upper seatback horizontal position the second seatback angle $\theta_{s2}$ can be adjusted from 80° to 200°, and preferably from 90° to 180°, in order to move the upper seatback 24 from being substantially vertical to being substantially horizontal in an aftward direction. Similarly, from the upper seatback horizontal position to the upper seatback vertical position the second seatback angle $\theta_{s2}$ can be adjusted from 200° to 80°, and preferably from 180° to 90°, in order to move the lower seatback 22 from being substantially aligned with the seat bottom 14 to being substantially perpendicular with the seat bottom 14 in a forward direction.

In some embodiments, the upper seatback 24 and/or the upper seatback actuation system 800 can be configured to provide an adjustment with precision. For example, the second seatback angle $\theta_{s2}$ can be adjusted from the upper seatback vertical position to the upper seatback horizontal position, and vice-versa, by a second seat back incremental step $\delta\theta_{s2}$ sufficiently small to not be noticeable by a passenger using the seat 10. For example, the second seat back incremental step $\delta\theta_{s2}$ can be between 0.0001° and 10°, and preferably between 0.001° and 1°.

In addition, the first seatback incremental step $\delta\theta_{s1}$ and the second seatback incremental step $\delta\theta_{s2}$ can be different as the upper seatback 24 and the lower seatback 22 may correspond to different body parts of the passenger with different sensibilities.

In some implementations, the headrest 26 can be articulated between the headrest contracted position and the headrest extended position, via a headrest actuation system 260, as illustrated in FIGS. 6 and 8, to provide support for a head of the passenger regardless of positions taken by the passenger on the seat 10. For example, in the headrest contracted position, a lower portion of the headrest 26 can be in contact with an upper portion of the upper seatback 24, as illustrated in FIGS. 1-2, while in the headrest extended position the lower part of the headrest 26 can be distend from the upper portion of the upper seat 26, as illustrated in FIGS. 7-8.

In some implementations, the headrest 26 and/or the headrest actuation system 260 can be configured to provide a range of adjustment sufficiently large to support the head of the passenger with comfort for a multitude of passenger morphologies. For example, a headrest distance D between the upper portion of the upper seatback 24 and the lower portion of the headrest 26 can be adjusted from 0 inch to 6 inches, and preferably form 0 inch to 4 inches, to provide comfort to a passenger using the seat 10.

In some embodiments, the headrest 26 and/or the headrest actuation system 260 can be configured to provide an adjustment with precision. For example, the headrest distance D can be adjusted, via the headrest actuation system 260, from the headrest contracted position to the headrest horizontal position, and vice-versa, by a headrest incremental step $\delta_h$ sufficiently small to not be noticeable by a passenger using the seat 10. For example, the headrest incremental step $\delta_h$ can be between 0.01 inch and 0.25 inch, and preferably between 0.01 inch and 0.1 inch.

In some implementations, the legrest 16 can be articulated between the legrest vertical position and the legrest horizontal position, via a legrest actuation system 900, as illustrated in FIGS. 6 and 8, to provide support for the legs of the passenger regardless of positions taken by the passenger on the seat 10. For example, in the legrest vertical position, the legrest 16 is substantially aligned with a vertical plane, as illustrated in FIGS. 1-2, while in the legrest horizontal position the legrest 16 is substantially aligned with a horizontal plane, as illustrated in FIGS. 7-8. The legrest 16 can be articulated between the legrest vertical position and the legrest horizontal position by adjusting, via the legrest actuation system 900, a legrest angle $\theta_1$ formed between the seat bottom 14 and the legrest 16.

In some embodiments, the legrest 16 and/or the legrest actuation system 900 can be configured to provide a range of adjustment sufficiently large to support the legs with comfort for a multitude of passenger morphologies. For example, from the legrest vertical position to the legrest horizontal position the legrest angle $\theta_1$ can be adjusted from 250° to 160°, and preferably from 270° to 180°, in order to move the legrest 16 from being substantially vertical to being substantially aligned with the seat bottom 14 in the foreward direction. Similarly, from the legrest horizontal position to the legrest vertical position the legrest angle $\theta_1$ can be adjusted from 160° to 250°, and preferably from 270° to 180°, in order to move the legrest from being substantially aligned with the seat bottom 14 to being substantially vertical in a aftward direction.

In some embodiments, the legrest 16 and/or the legrest actuation system 900 can be configured to provide an adjustment with precision. For example, the legrest angle $\theta_1$ can be adjusted from the legrest vertical position to the legrest horizontal position, and vice-versa, by a legrest incremental step $\delta\theta_1$ sufficiently small to not be noticeable by a passenger using the seat 10. For example, the legrest incremental step $\delta\theta_1$ can be between 0.0001° and 10°, and preferably between 0.001° and 1°.

In some implementations, the articulations of the headrest 26, the upper seatback 24, the lower seatback 22, and/or the legrest 16 can be coupled to articulate the seat 10 between the upright sitting position and the horizontal sleeping position in order to facilitate the use of the seat 10. For example, the headrest distance D, the first seatback angle $\theta_{s1}$, the second seatback angle $\theta_{s2}$, and the legrest angle $\theta_1$ can be coupled together to articulate the legrest 16, the lower seatback 22, the upper seatback 24, and/or the headrest 26 under one single actuation to directly articulate the seat 10 from the upright sitting position to the in-bed lounge sitting position, and vice-versa, from the upright sitting position to the horizontal sleeping position, and vice-versa, and from the in-bed lounge sitting position to the horizontal sleeping position, and vice-versa.

Although the passenger seats illustrated in FIGS. 1-8 include a generally similar upholstering and body shape, the multi-segmented back rest mechanisms can be built into a number of different seat designs. In some embodiments, the seat 10 may include a partial foot rest rather than extending to a full bed. For example, the partial foot rest may meet with a separate foot stool to provide a lie-flat bed position. Some embodiments may include narrower bodies and/or head rest portions. In some implementations, rather than having armrests 18 flush with the bed-positioned seat 10 (see, e.g., FIG. 5), the armrests may be raised above the level of the seat upon extension. In a particular example, the armrests 18 may be modified to provide rails, maintaining a sleeping passenger in the seat 10 despite shifting. The seat 10, in additional embodiments, may include a privacy shell (e.g., extending around the head rest and forwards to a portion of the armrests) to provide the passenger with privacy, personal overhead lighting and/or speakers, and/or additional amenities. In another example, the seat 10 may be embedded in a suite surround incorporating, in some examples, an extendable tray table, video monitor, cup holder, lighting, speakers, and/or convenience controls. Other modifications are possible. Certain modifications are discussed in further detail below.

Referring to FIGS. 9-22, the seat base, in some embodiments, generally includes spaced left and right spreaders 30, 32, forward and rear transverse beam tubes 34, 36, and spaced left and right legs 38, 40. The legs 38, 40 may be attached to seat tracks 42 in the floor 28 of the cabin using conventional anti-rattle track fasteners. The seat base frame, for example, may support the weight of the seat, houses actuators and associated cabling, and may help to guide the movement of the seat 10 throughout its range of motion.

Figure 9:
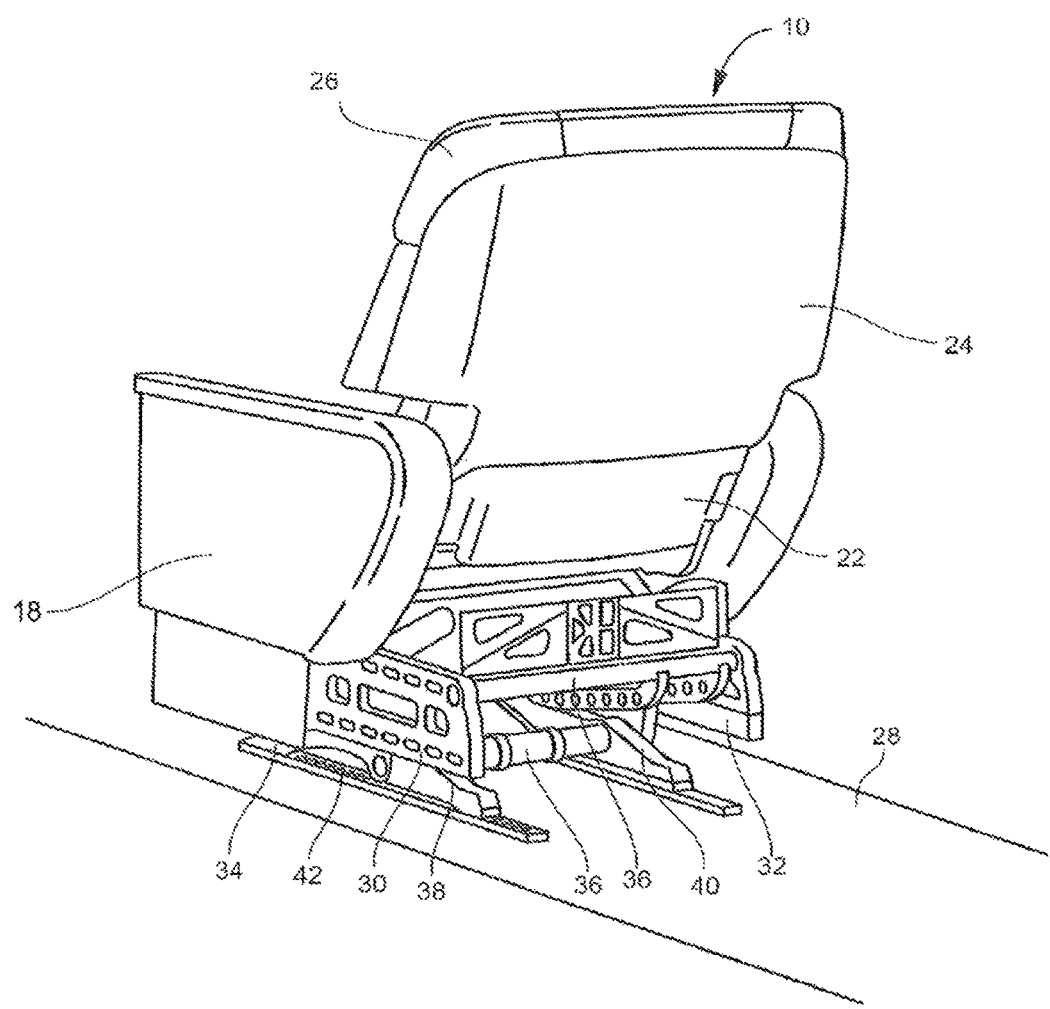
FIG. 9 is a rear perspective view of an aircraft passenger seat showing the lower and upper seatbacks and the headrest, according to certain aspects of the disclosure.
Figure 10:
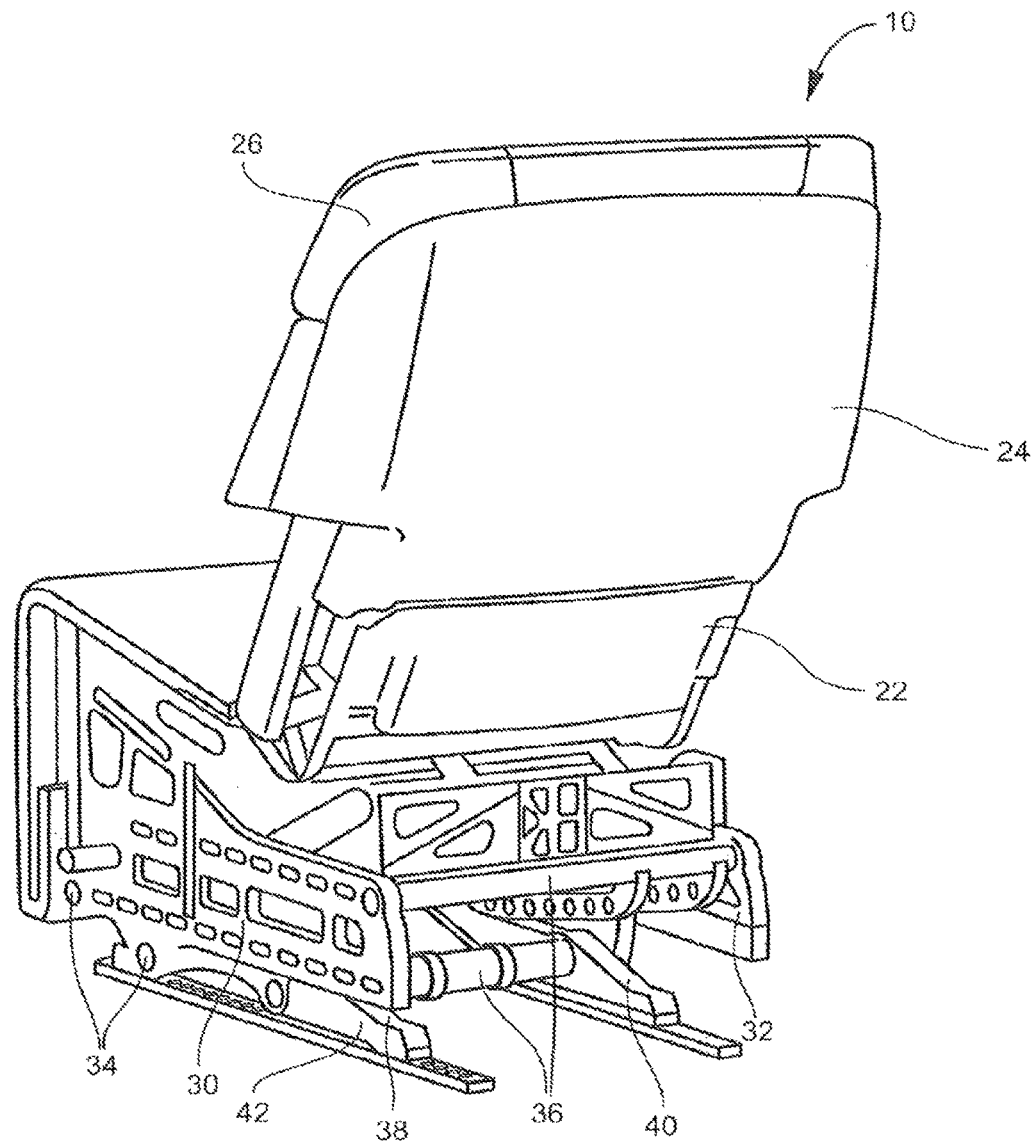
FIG. 10 is a rear perspective view of the seat of FIG. 9 shown with armrests removed for clarity, according to certain aspects of the disclosure.
Figure 11:
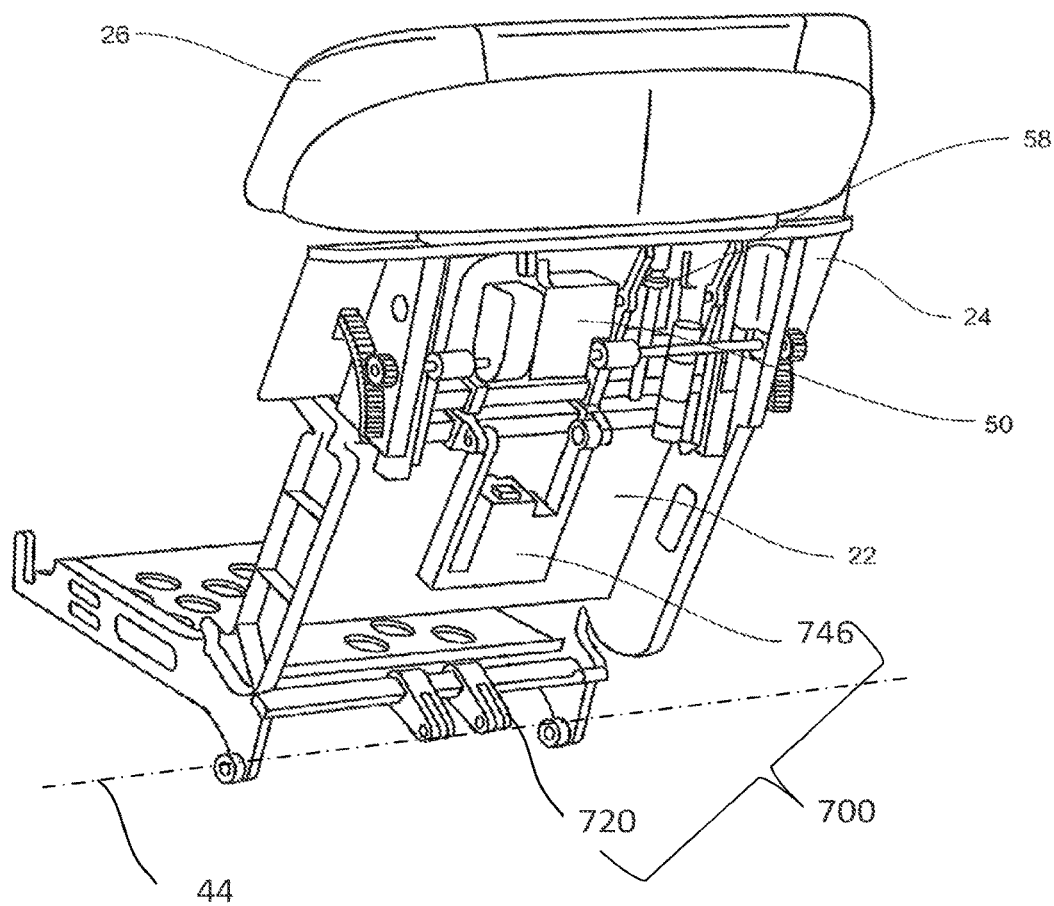
FIG. 11 is an isometric view of a seat pan; of an aircraft passenger seat, according to certain aspects of the disclosure.

Referring to FIGS. 9-11, the lower seatback 22, upper seatback 24, and headrest 26, in some implementations, are able to move independently as the seatback 12 is articulated from the upright sitting position to the horizontal sleeping position. More precisely, the lower seatback 22, upper seatback 24, and headrest 26 may each be independently articulated between the sitting position and the sleeping via the lower seatback actuation system 700, the upper seatback actuation system 800, and the headrest actuation system 260, respectively.

Figure 12:
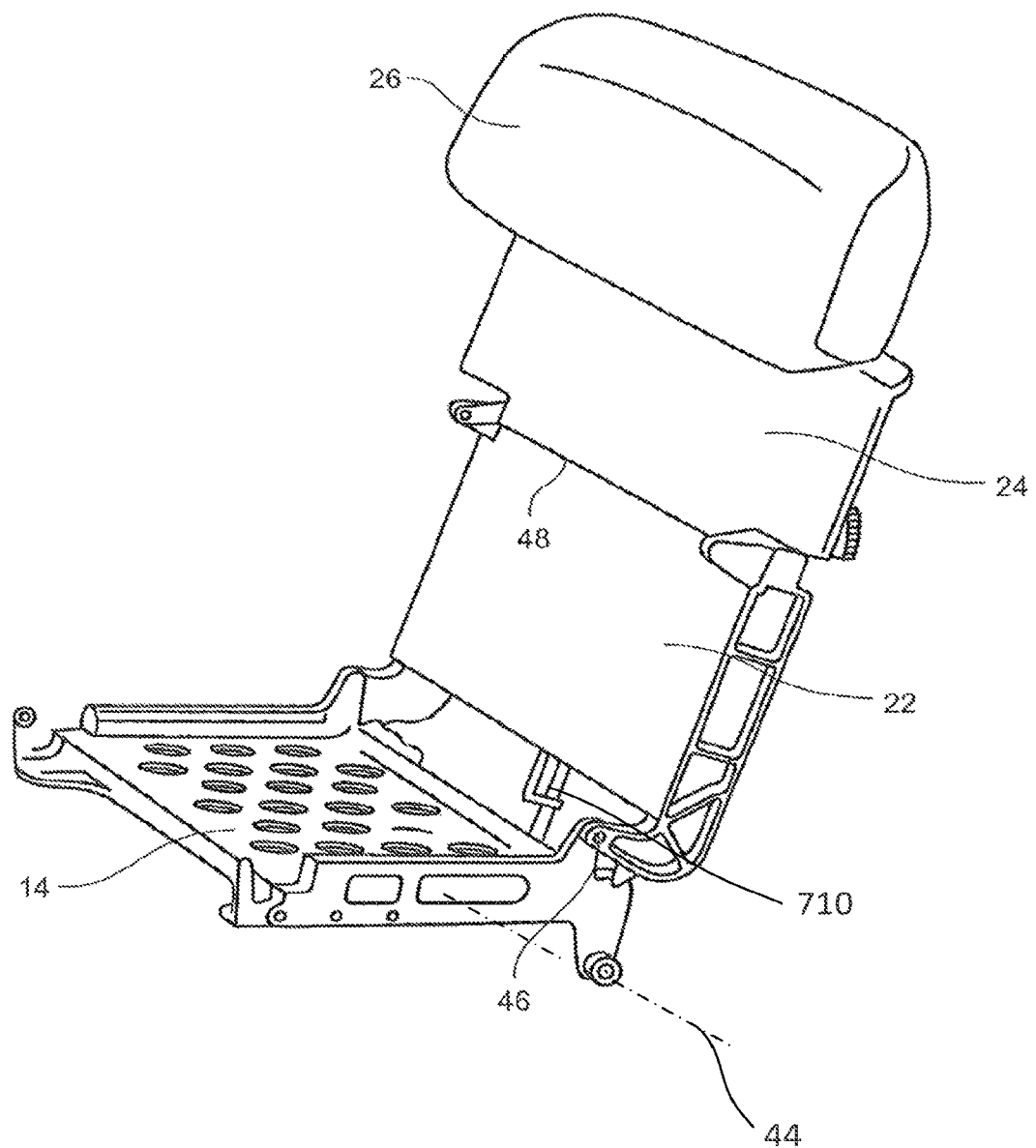
FIG. 12 is a front perspective view of the seat pan of FIG. 11, according to certain aspects of the disclosure.
Figure 13:
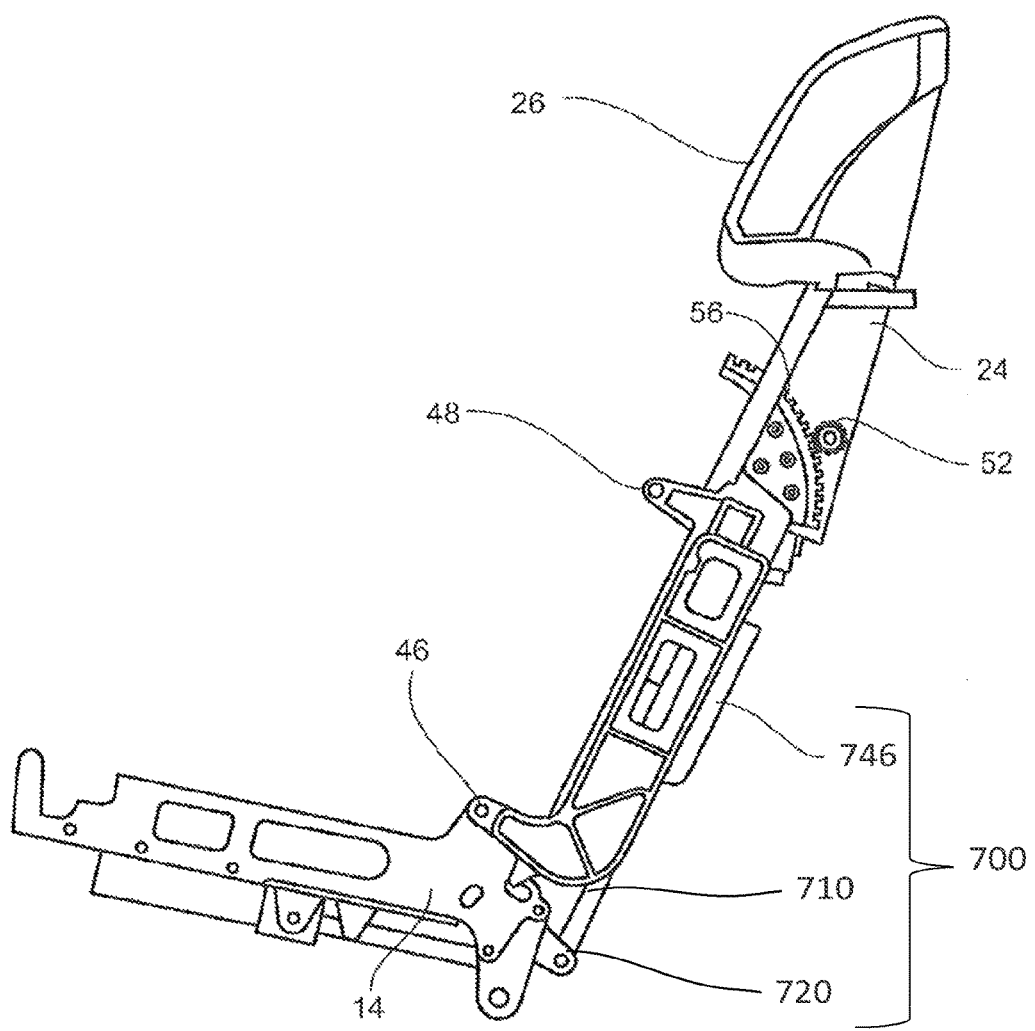
FIG. 13 side view of the seat pan of FIG. 11, according to certain aspects of the disclosures.

Referring now to FIGS. 11-13, in some embodiments, the bottom end of the lower seatback 22 can be pivotally attached to the rear end of the seat bottom 14 such that the lower seatback 22 pivots relative to the seat bottom around a pivot axis 44 to adjust the first seatback angle $\theta_{S1}$, via the lower seatback actuation system 700. The lower seatback actuation system 700 can be arranged vertically along the backside of the lower seatback 22 and attached to the seat bottom 14 to rotate the lower seatback 22 relative to the seat bottom 14 around the pivot axis 44 to adjust the first seatback angle $\theta_{S1}$ between the seat bottom 14 and the lower seatback 22.

For example, the lower seatback actuation system 700 can include a first electromechanical actuator 746 (e.g. a linear actuator, a step motor, or a solenoid), a lower seatback linkage 710 (e.g., a threaded rod with ball-screw, driven by the first electromechanical actuator 746), and a mounting bracket 720 affixed to the seat bottom 14 and rotatably affixed to a terminal end of the lower back linkage 710.

For articulating the lower seatback 22 from lower seatback vertical position to the lower seatback horizontal position, the first electromechanical actuator 746 may push the lower seatback 22 along the lower seatback linkage 710 and against the seat bottom 14 in a downward direction as the lower seatback 22 rotates around the pivot axis 44 in a clockwise direction in order to increase the first seatback angle $\theta_{S1}$ by the first seatback incremental step $\delta\theta_{s1}$.

For articulating the lower seatback 22 from the lower seatback horizontal position to lower seatback vertical position, the first electromechanical actuator 746 may pull the lower seatback 22 along the lower seatback linkage 710 and against the seat bottom 14 in a upward direction as the lower seatback 22 rotates around the pivot axis 44 in a counterclockwise direction in order decrease the first seatback angle $\theta_{S1}$ by first seatback incremental step $\delta\theta_{s1}$.

The bottom end of the upper seatback 24, in some embodiments, is pivotably attached to the top end of the lower seatback 22 such that the upper seatback 24 pivots relative to the lower seatback 22 around a pivot axis 48 to adjust the second seatback angle $\delta_{S2}$, via the upper seatback actuation system 800.

Figure 14:
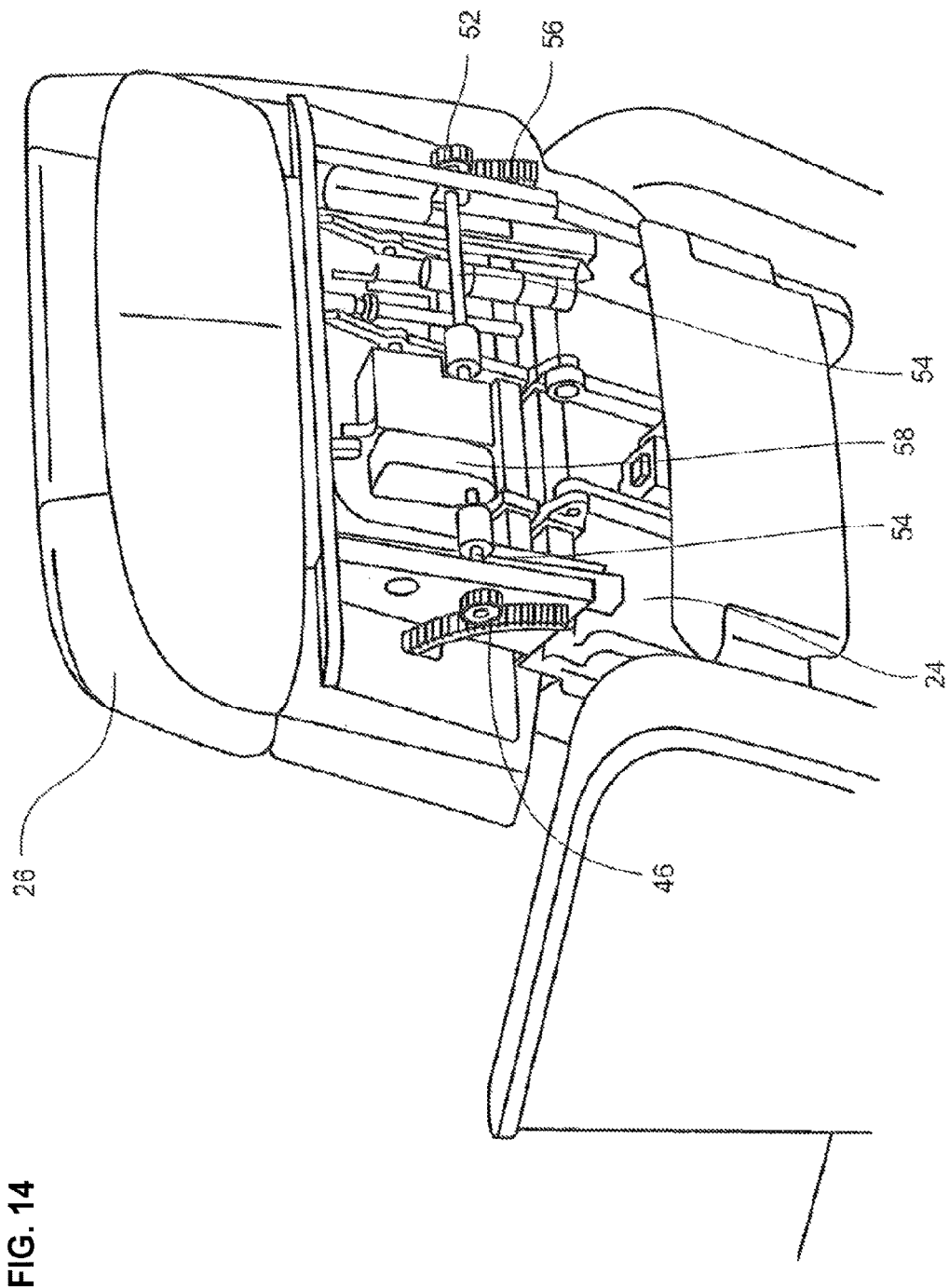
FIG. 14 is a detailed view of the upper seatback actuation system, according to certain aspects of the disclosure.
Figure 15:
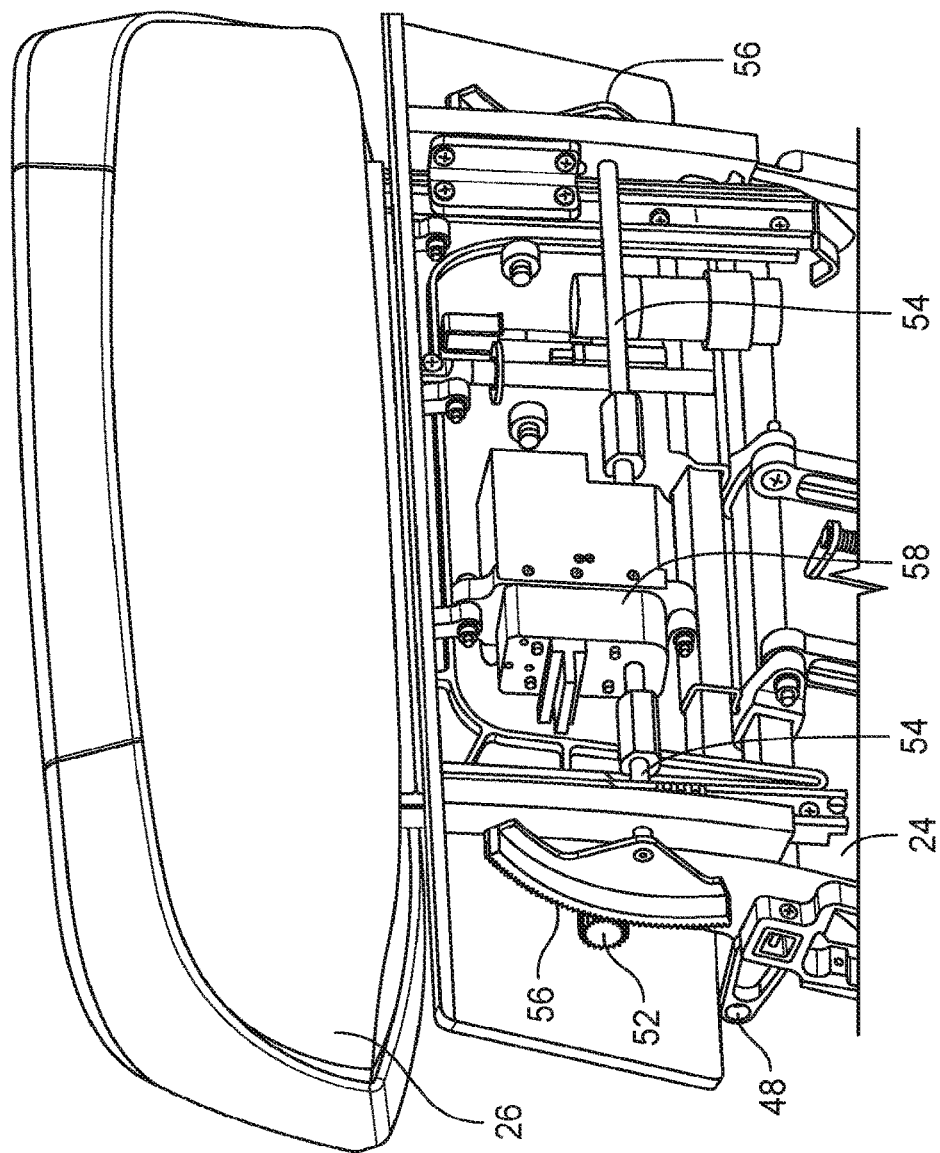
FIG. 15 is a detailed view the upper seatback actuation system in a supplementary configuration, according to certain aspects of the disclosure.

Referring now to FIGS. 14 and 15, in some embodiments, the upper seatback actuation system 800 can be arranged horizontally on the backside of the upper seatback 24 to rotate the upper seatback 24 relative to the lower seatback 22 around the axis 46 and adjust the second seatback angle $\theta_{S2}$ between the lower seatback 22 and the upper seatback 24.

The upper seatback actuation system 800 can include a second electromechanical actuator 50 (e.g. a linear actuator, a step motor, or a solenoid, etc.), a rotating shaft 54 driven by the second electromechanical actuator 50, gears 52 affixed to terminal ends of the rotating shaft 54, and an arcuate toothed member 56 affixed to the upper seatback 24 and meshed with the gears 52. The rotation of the shaft 54, by the second electromechanical actuator 50, can rotate the gears 52 along a length of the arcuate toothed member 56 to rotate the upper seatback 24 around the axis 46 and to adjust the second seatback angle $\theta_{S2}$ between the lower seatback 22 and the upper seatback 24.

The length, curvature, and orientation of the arcuate toothed member 56, as well as the gear diameter and number of gear teeth, can be customized to adjust the angle, speed and range of movement of the upper seatback 24 relative to the lower seatback 22. For example, the accurate toothed member 56 can have a predetermined length, a predetermined curvature, a predetermined gear diameter, and a predetermined number of teeth such that the second seatback angle $\theta_{s2}$ can be adjusted between 80° and 200° with the second seatback incremental step $\delta\theta_{s2}$ between 0.0001° and 10°.

For articulating the upper seatback 24 from upper seatback vertical position to the upper seatback horizontal position, the second electromechanical actuator 50, in some embodiments, can drive the shaft 22 to rotate the accurate toothed member 56 in a clockwise direction and rotate the lower seatback 22 around the pivot axis 46 in a downward direction in order to increase the second seatback angle $\theta_{S2}$ by the second seatback incremental step $\delta\theta_{s2}$. Conversely, for articulating the upper seatback 24 from upper seatback horizontal position to the upper seatback vertical position, the second electromechanical actuator 50 can drive the shaft 22 to rotate the accurate toothed member 56 in a counterclockwise direction and rotate the lower seatback 22 around the pivot axis 46 in an upward direction in order to decrease the second seatback angle $\theta_{S2}$ by the first seatback incremental step $\delta\theta_{s1}$.

Referring now to FIG. 15, in some embodiments, the upper seatback actuation system 800 can have different configurations and/or arrangements to better suit the mechanical properties of the second electromechanical actuator 50, e.g. torque, rotational speed, or incremental precision, and/or the mechanical properties of the upper seatback 24, e.g. amplitude of articulation, or weight.

For example, the arcuate toothed member 56 can be driven by the shaft 54 while the gears 52 can be affixed to the upper seatback 24 to rotate the upper seatback 24 around the pivot axis 46 when the second electromechanical actuator 50 outputs a low rotational speed but a high torque.

Figure 16:
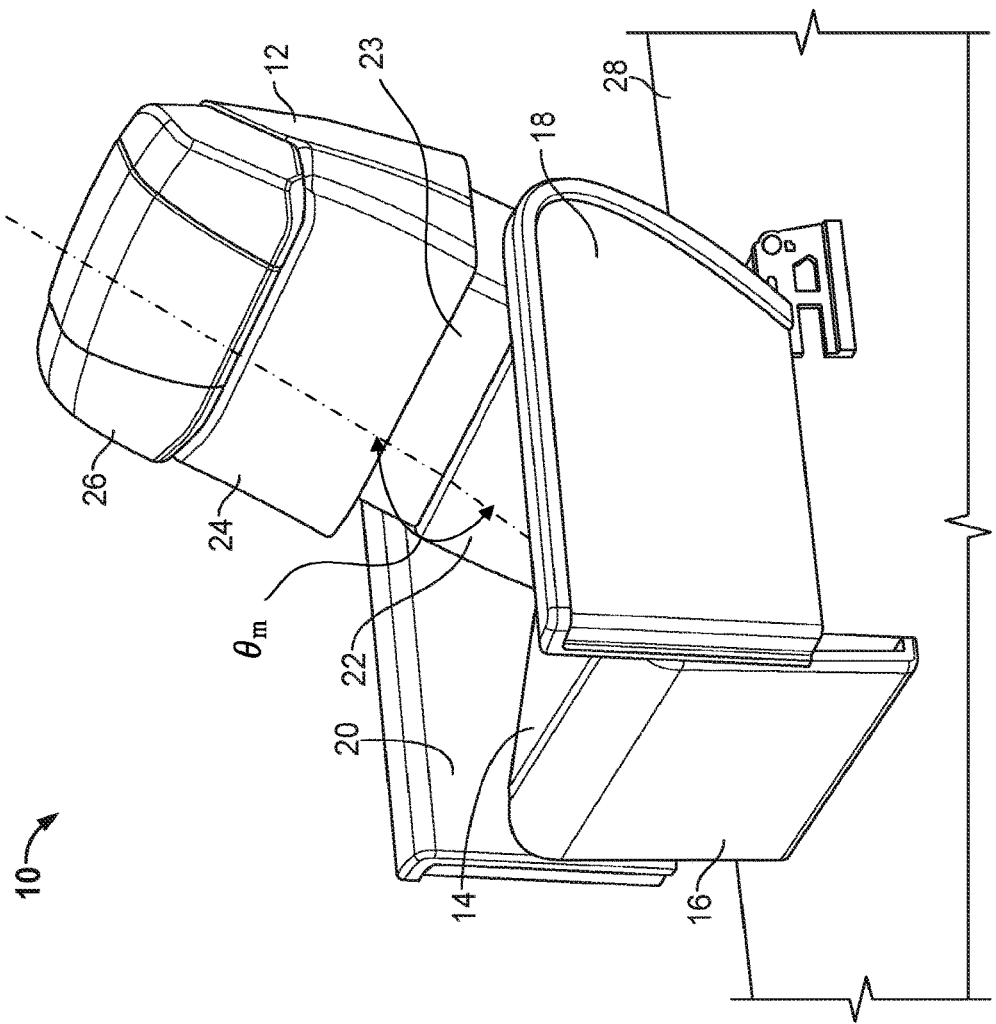
FIG. 16 is a front perspective view of an aircraft passenger seat with a middle seatback in a vertical position, according to certain aspects of the disclosure.
Figure 17:
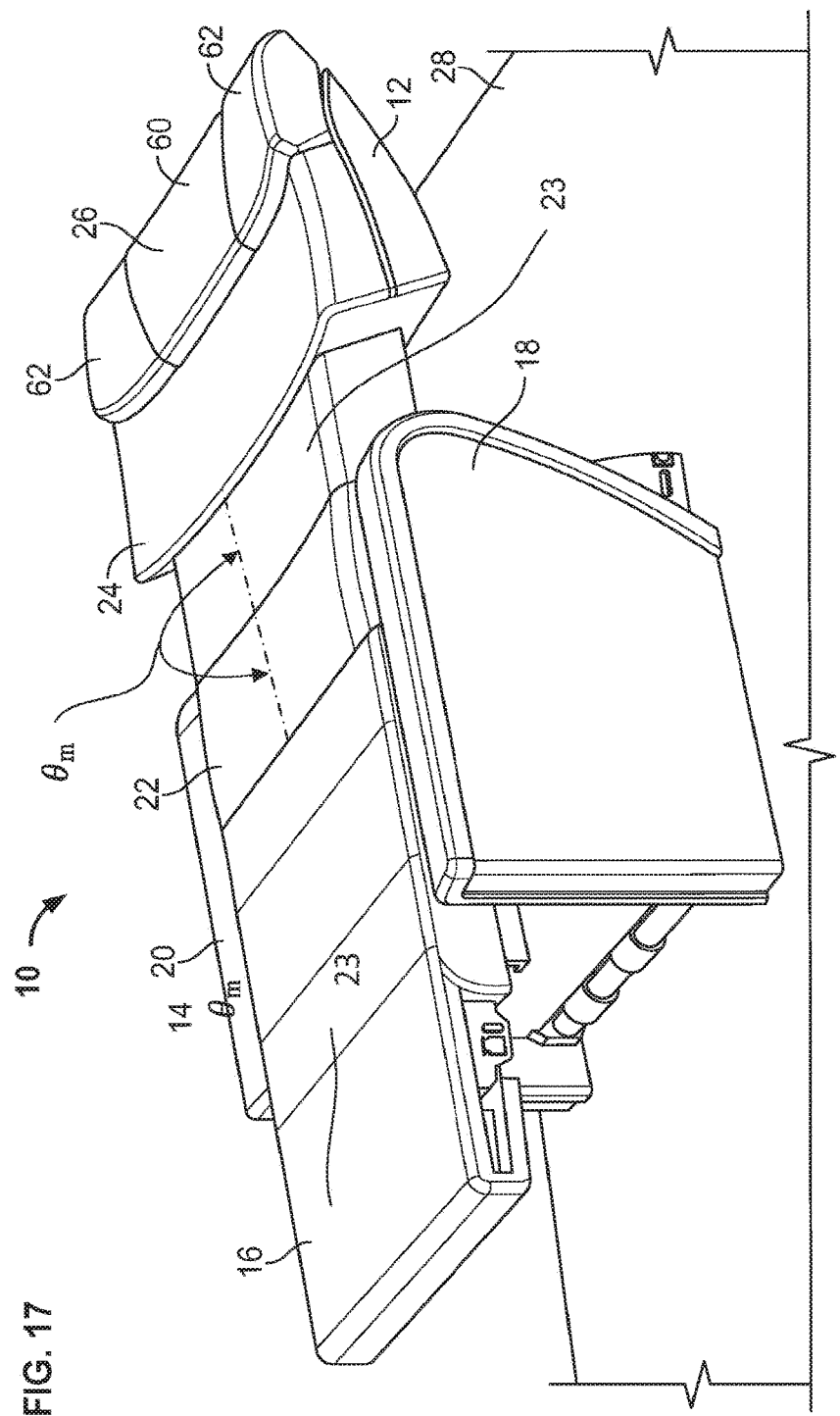
FIG. 17 is a front perspective view of an aircraft passenger seat with the middle seatback in a horizontal position, according to certain aspects of the disclosure.

Now referring to FIGS. 16-17, in some embodiments, a middle seatback 23 is placed between the lower seatback 22 and the upper seatback 24 to provide better comfort to the passenger, as illustrated. For example, the middle seatback 23 can be articulated from a middle seatback horizontal position to a middle seatback vertical position, and vice-versa, to provide lumbar support to a passenger using the seat 10.

In the middle seatback vertical position the middle seatback 23 is substantially aligned with a vertical plane, as illustrated in FIG. 16, while in the middle seatback horizontal position the middle seatback 23 is substantially aligned with a horizontal plane, as illustrated in FIG. 17. The middle seatback 23 can be articulated between the middle seatback vertical position and the middle seatback horizontal position via a middle seatback actuation system that can be similar as the lower seatback actuation system 700 and/or the upper seatback actuation system 800.

In some implementations, the middle seatback 23 can be configured to provide a range of adjustment sufficiently large to support the lumbar of the passenger with comfort for a multitude of passenger morphologies. For example, from the middle seatback vertical position to the middle seatback horizontal position a middle seatback angle $\theta_m$ between the lower seatback 22 and the middle seatback 23 can be adjusted, via the middle seatback actuation system, from 80° to 200°, and preferably from 90° to 180°, in order to move the middle seatback 23 from being substantially vertical to being substantially horizontal in an aftward direction. Similarly, from the middle seatback horizontal position to the middle seatback vertical position the middle seatback angle $\theta_m$ can be adjusted from 200° to 80°, and preferably from 180° to 90°, in order to move the middle seatback 23 from being substantially horizontal to being substantially vertical in a forward direction.

In some embodiments, the middle seatback 23 can be configured to provide a lumbar adjustment with precision. For example, the middle seatback angle $\theta_m$ can be adjusted from the middle seatback vertical position to the middle seatback horizontal position, and vice-versa, by a middle seatback incremental step $\delta\theta_m$ sufficiently small to not be noticeable by a passenger using the seat 10. Particularly, the middle seatback incremental step $\delta\theta_m$ can be between 0.0001° and 10°, and preferably between 0.001° and 1°.

Figure 18:
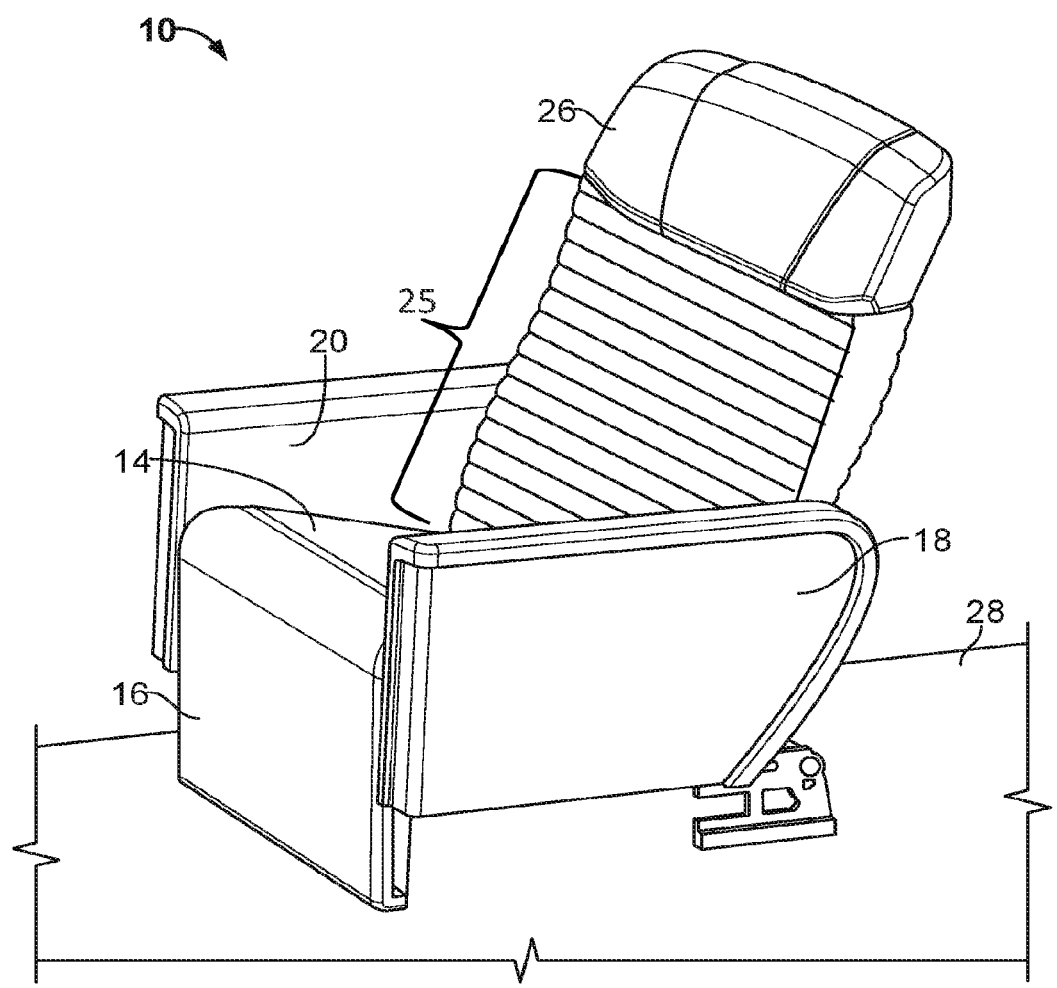
FIG. 18 is a front perspective view of an aircraft passenger seat with a series seatback portions in a vertical position, according to certain aspects of the disclosure.
Figure 19:
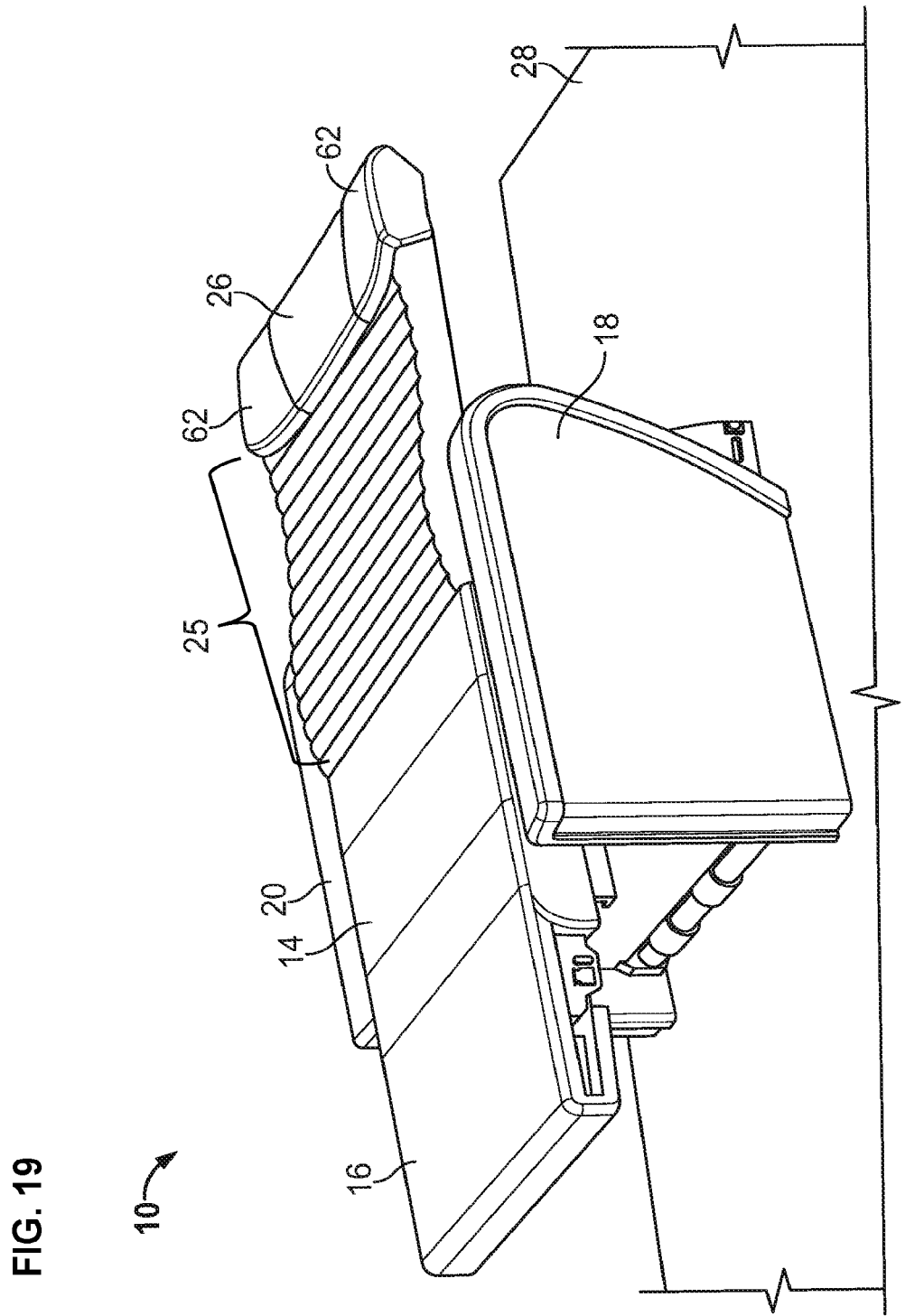
FIG. 19 is a front perspective view of an aircraft passenger seat with the series seatback portions in a horizontal position, according to certain aspects of the disclosure.

Now referring to FIGS. 18-19, in some embodiments, a series of seatback sections 25 replace the lower seatback 22, the middle seatback 23, and the upper seatback 23 to provide better comfort to the passenger, as illustrated. For example, the series of seatback sections 25 can be articulated between a seatback horizontal position and a seatback vertical position, and vice-versa, and notably through a curvilinear position to follow a curvature of a back of a passenger using the seat 10.

In the seatback vertical position, the series of seatback sections 25 can form a substantially flat vertical surface, as illustrated in FIG. 18, while in the seatback horizontal position the series of seatback sections 25 can form a substantially flat horizontal surface, as illustrated in FIG. 19. The curvilinear position can correspond to an intermediate position between the seatback vertical position and the seatback horizontal position for which the series of seatback sections 25 forms a concave surface that follows the back of the passenger. The series of seatback sections 25 can be articulated between the seatback vertical position and the seatback horizontal position via a series of actuation systems. The series of actuation systems can be configured to articulate each seatback section of the series of seatback sections 25 independently by having each actuation system of the series of actuation systems articulating one seatback section of the series of seatback sections 25.

In some embodiments, the series of seatback sections 25 can have a spatial configuration to follow the anatomy of the passenger in order to increase comfort. For example, each seatback section of the series of seatback sections 25 can be parallel from each other, placed along a width of the seat 10, and be equidistant from each other to follow a spine articulation of the passenger, as illustrated in FIGS. 18-19. In an alternative example, instead of being equidistantly placed from each other the series of seatback sections 25 can be closer to each other in area where the spine of the passenger can exhibit a strong curvature, e.g. a middle section of the back, to accurately follow the spine of the passenger and increase comfort.

Referring to FIGS. 20-27, the headrest 26, in some implementations, can be supported by the upper seatback 24 of the seat 10 and be articulated from the headset contracted position to the headset extended position, and vice-versa, to provide better comfort to a passenger using the seat 10. The articulation of the headrest 26 from the headrest contracted position to the headrest extending position, and vice-versa, can be performed, for example, via the headrest actuation system 260 that can be placed on the backside of the upper seatback 24. The headrest actuation system 260 can be arranged vertically along the backside of the upper seatback 24 and attached to the bottom end of the headrest 26, in some embodiments, to adjust the position of the headrest 26 relative to the upper seatback 24.

Figure 21:
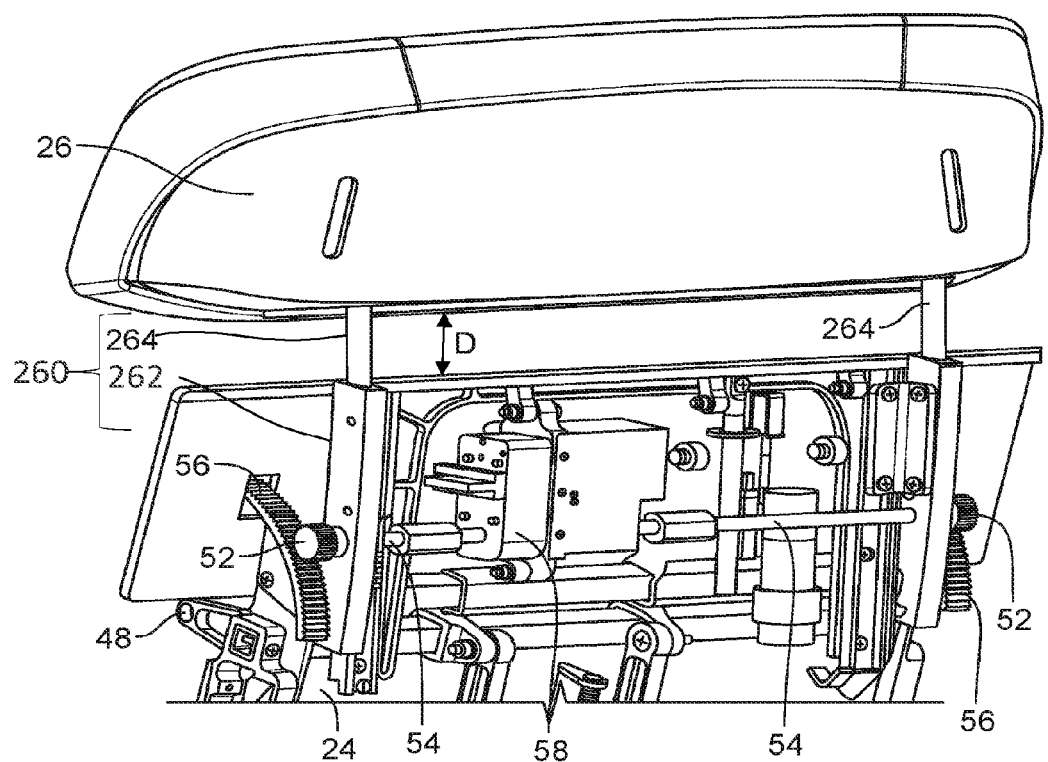
FIG. 21 is perspective back view of a headrest showing a headrest actuation system, configured for the first rectilinear course, according to certain aspects of the disclosure.

Turning to FIG. 21, in some implementations, the headrest actuation system 260 includes a third electromechanical actuator 58, a pair of support rails 262 affixed to the upper seatback 24, and a pair sliding rails 264 sliding along the pair of support rails 262 and affixed at an upper end to a lower portion of the headrest 26. The third electromechanical actuator 58 may be configured to slide the pair of sliding rails 264 along the pair of support rails 262 in order to adjust the headrest distance D. For example, for the articulation of the headrest 26 from the headrest contracted position to the headrest extended position the third electromechanical actuator 58 can push the pair of sliding rails 264 along the pair of support rails 262 to move the headrest 26 away from the upper end of the upper seatback 24 and increase the headrest distance D by the headrest incremental step $\delta_h$. Conversely, for the articulation of the headrest 26 from the headrest extended position to the headrest contracted position the third electromechanical actuator 58 can pull the pair of sliding rails 264 along the pair of support rails 262 to move the headrest 26 closer to the upper end of the upper seatback 24 and decrease the headrest distance D by the headrest incremental step $\delta_h$.

Figure 20:
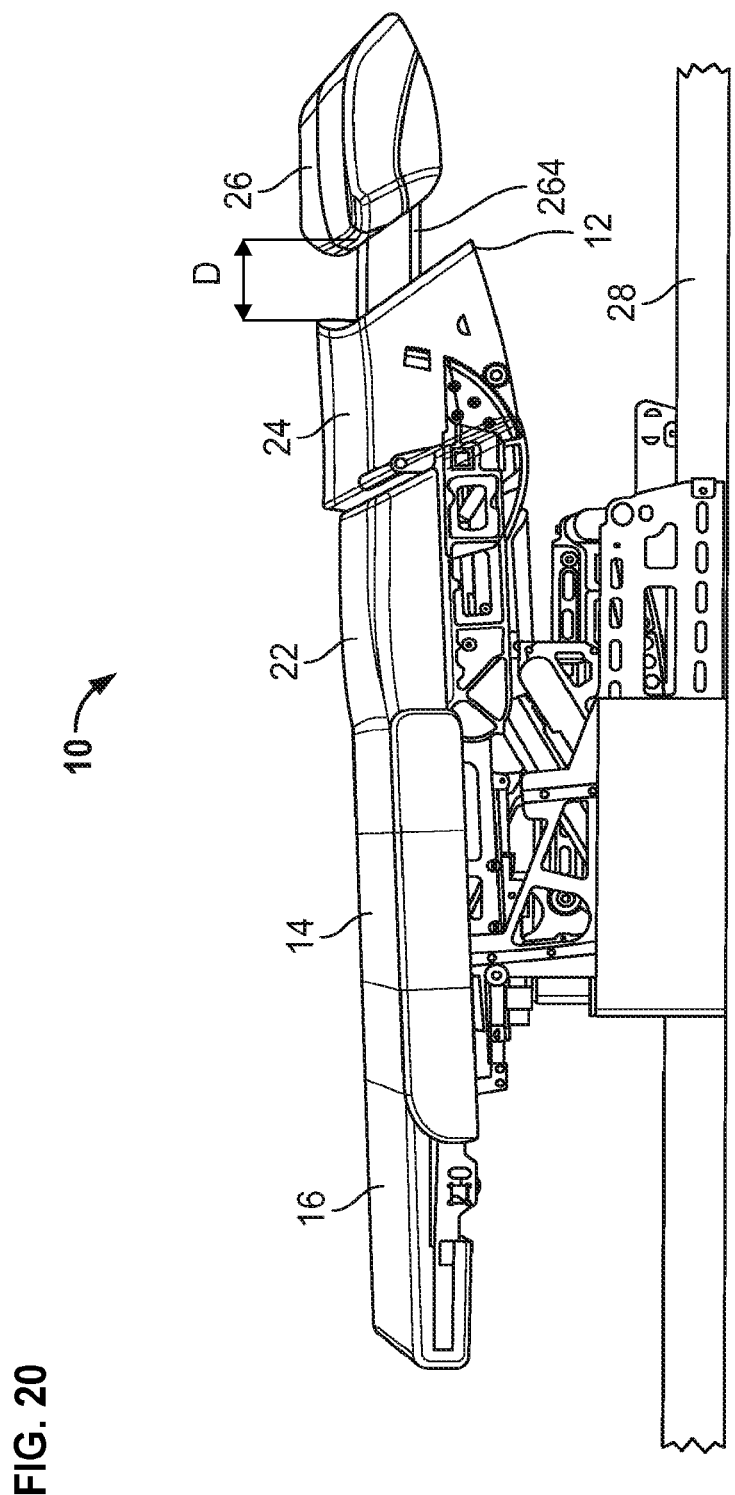
FIG. 20 is a side view of an aircraft passenger seat with the headrest in an extended position following a first rectilinear course, according to certain aspects of the disclosure.

In some embodiments, the articulation of the headrest 26 from the extended position to the contracted position, and vice-versa, is performed along a variety of courses or motions to better follow anatomical characteristics of the passenger. Referring now to FIGS. 20-21, for example, the articulation of the headrest 26 can be performed along a first rectilinear course substantially aligned with the upper seatback 24, as illustrated in FIG. 20, to provide a stretching support along a neck of the passenger. The articulation of the headrest 26 along the first rectilinear course can be performed by having the pair of sliding rails 264 and the pair of support rails 262 substantially straight and substantially aligned with the upper seatback 24, as illustrated in FIG. 21.

Figure 22:
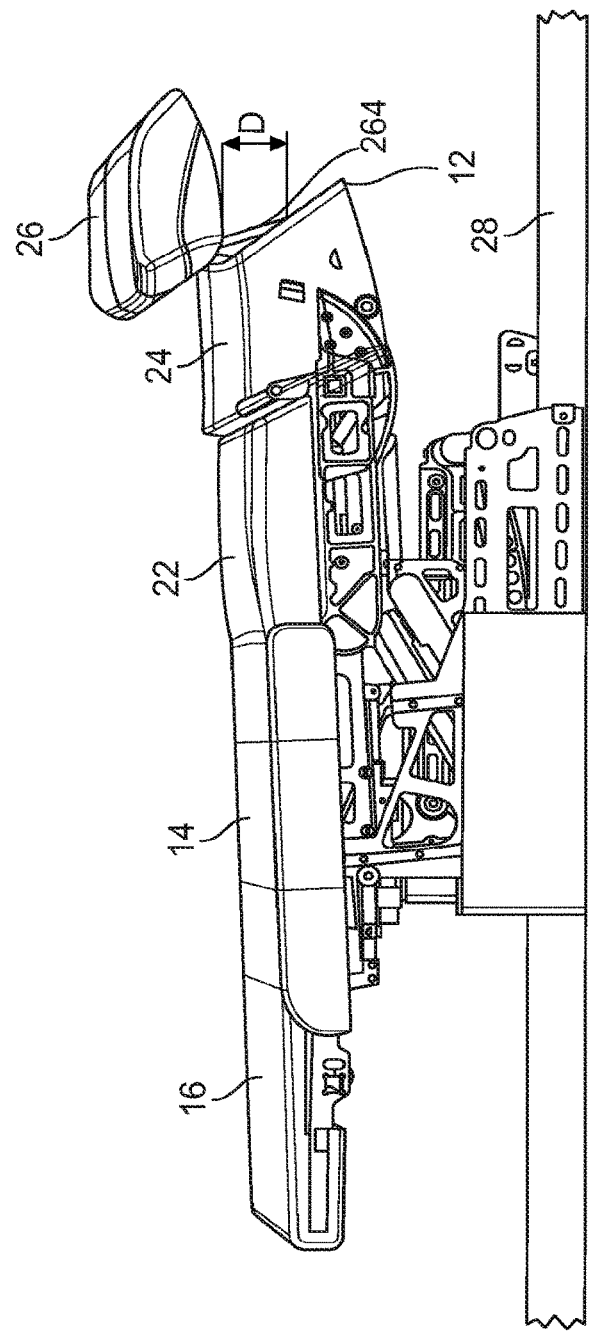
FIG. 22 is a side view of an aircraft passenger seat with the headrest in an extended position following a second rectilinear course, according to certain aspects of the disclosure.
Figure 23:
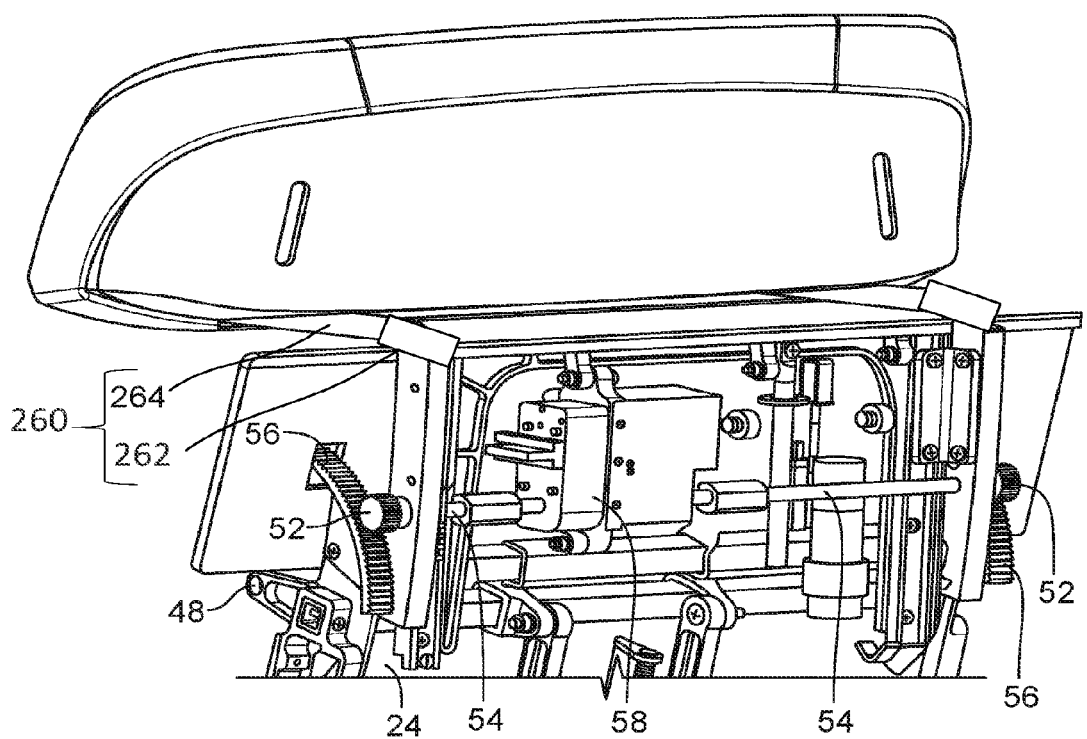
FIG. 23 is perspective back view of a headrest showing a headrest actuation system, configured for the second rectilinear course, according to certain aspects of the disclosure.

Referring now to FIGS. 22-23, in some implementations, the articulation of the headrest 26 can be performed along a second rectilinear course substantially perpendicular with the upper seatback 24, as illustrated in FIG. 22, to provide a front-to-back support of a head of the passenger. The articulation of the headrest 26 along the second rectilinear course can be performed by having the pair of sliding rails 264 and the pair of support rails 262 substantially straight and substantially perpendicular with the upper seatback 24 and placed on a upper end of the upper seatback 24, as illustrated in FIG. 23.

Figure 24:
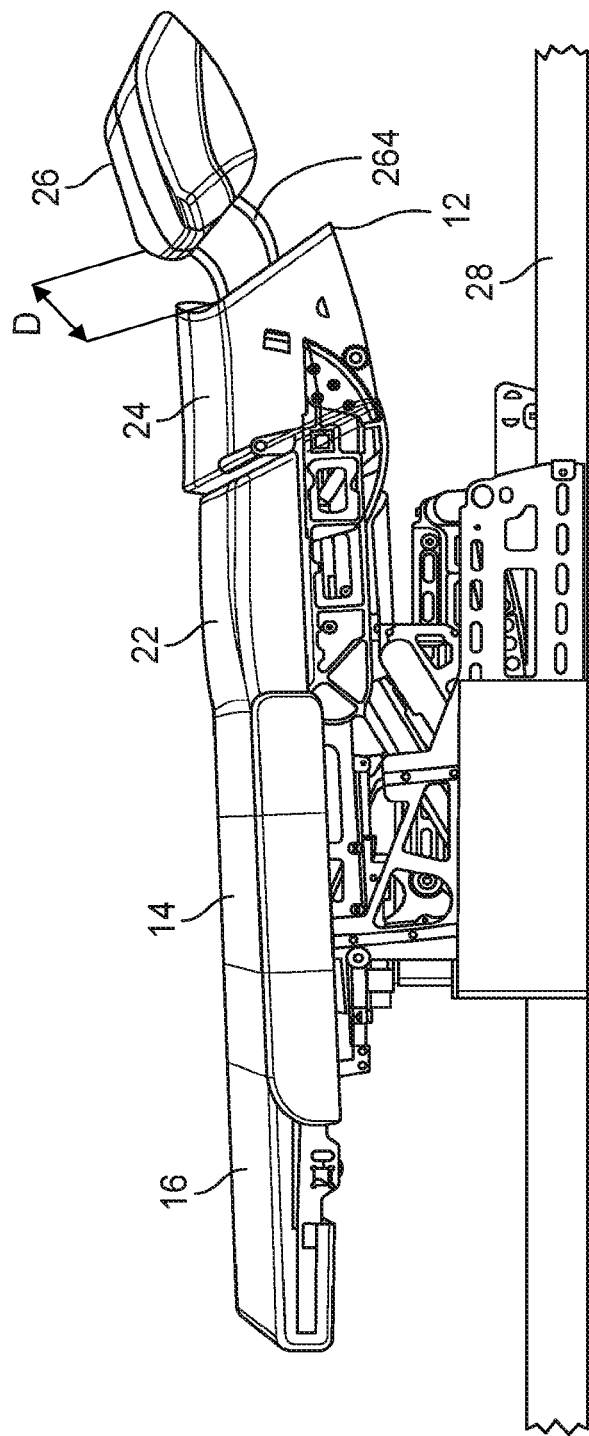
FIG. 24 is a side view of an aircraft passenger seat with the headrest in an extended position following a curvilinear course, according to certain aspects of the disclosure.
Figure 25:
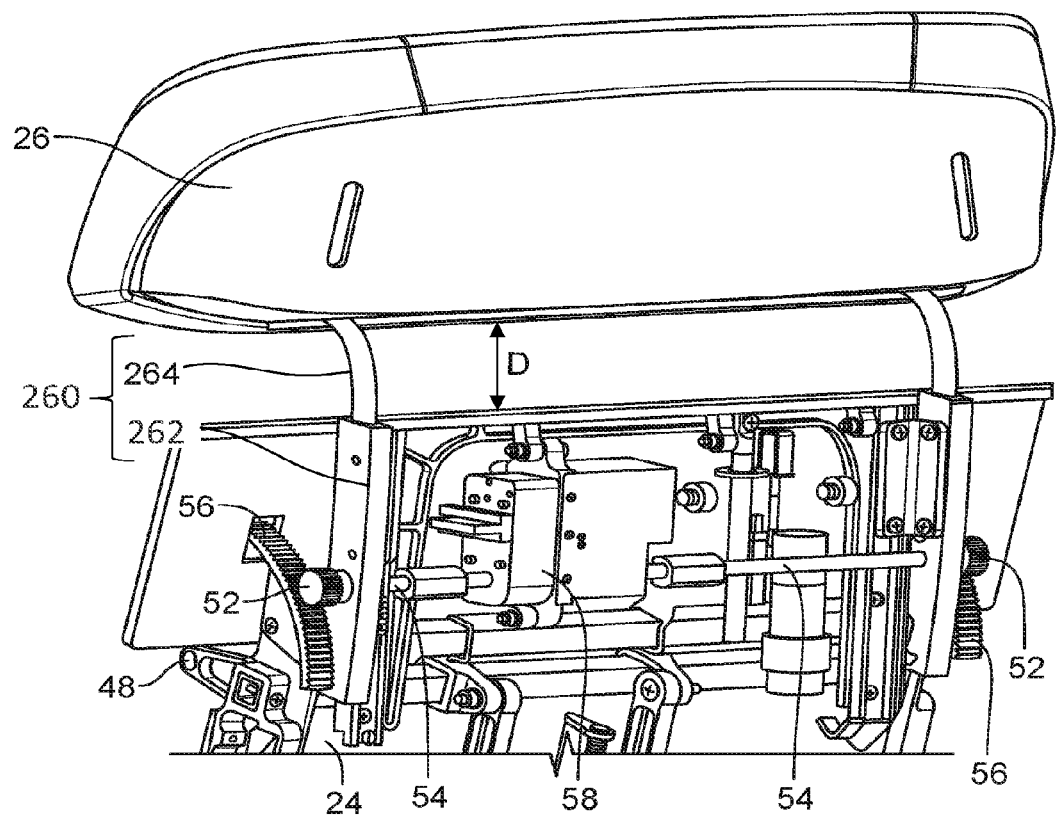
FIG. 25 is perspective back view of a headrest showing a headrest actuation system, configured for the curvilinear course, according to certain aspects of the disclosure.

Referring now to FIGS. 24-25, in another example, the articulation of the headrest 26 can be performed along a curvilinear course that starts from the upper end of the upper seatback 24 substantially aligned with the upper seatback 24 and finishes substantially perpendicular to the upper seatback 24, as illustrated in FIG. 24, to provide a stretching support along the neck of the passenger and a front-to-back support of a head of the passenger. The articulation of the headrest 26 along the second rectilinear course can be performed, for example, by having the pair of sliding rails 264 and the pair of support rails 262 substantially straight and substantially perpendicular with the upper seatback 24 and placed on a upper end of the upper seatback 24, as illustrated in FIG. 25.

Figure 26:
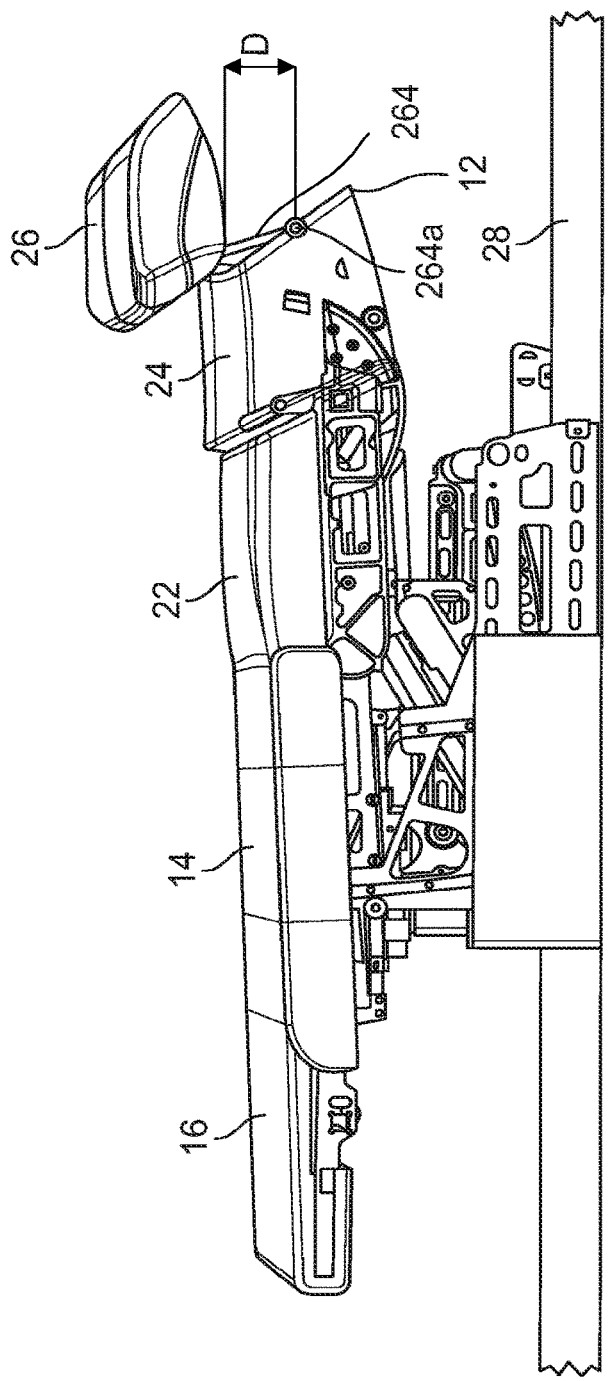
FIG. 26 is a side view of an aircraft passenger seat with the headrest in an extended position following a circular course, according to certain aspects of the disclosure.
Figure 27:
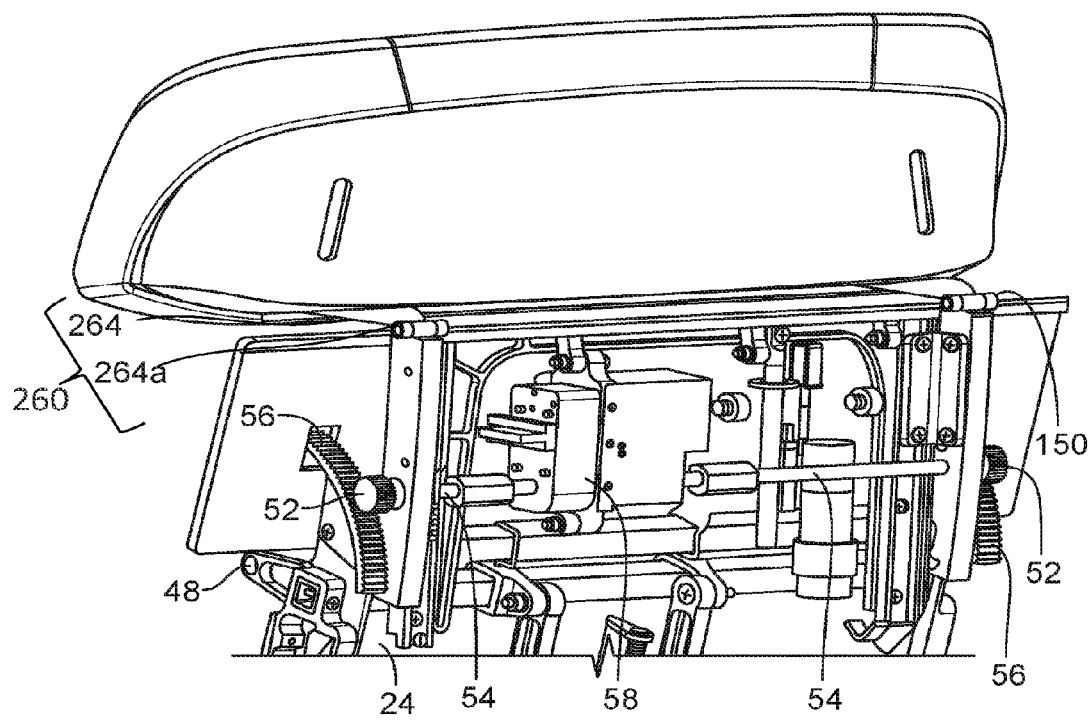
FIG. 27 is perspective back view of a headrest showing a headrest actuation system, configured for the circular course, according to certain aspects of the disclosure.

Referring now to FIGS. 26-27, in some implementations, the articulation of the headrest 26 can be performed along a circular course around a rotation axis substantially horizontal and placed between the upper seatback 24 and the headrest 26, as illustrated in FIG. 26, to provide support of the head of the passenger and to follow the inclination of the head. The articulation of the headrest 26 along the circular course can be performed by having a pivot system 264a, e.g. bearings, rotating shafts, hinges, or the like, actuated by a the third electromechanical actuator 58, as illustrated In FIG. 27.

In some embodiments, the articulations of the legrest 16, the headrest 26, the upper seatback 24, the lower seatback 22, the middle seatback 23, and/or the series of seatback sections 25 can be coupled together to articulate the seat 10 between the upright sitting position, the in-bed lounge sitting position, and the lie-flat position using a single action (e.g., press of a control button) from the passenger to provide convenience to the passenger in moving the seat between main positions of use.

For example, the seat can be articulated from the sleeping horizontal position to the in-bed lounge sitting position in a first step, and be articulated from the in-bed lounge sitting position to the sitting vertical position in a subsequent second step. In the first step, the coupling can be configured to articulate the headrest 26 and the upper seatback 24 simultaneously, from the headrest extended position to the headrest contracted position and from the upper seatback horizontal position to the upper seatback vertical position, while the lower seatback 22 is maintained in the lower seatback horizontal position and the legrest 16 is maintained in the legrest horizontal position. In the subsequent second step, the coupling can be configured to articulate the lower seatback 22 and the legrest 16 simultaneously, from the lower seatback horizontal position to the lower seatback vertical position and from the legrest horizontal position to the legrest vertical position, while the headrest 26 is maintained in the contracted position and the upper seatback 24 is maintained in the upper seatback vertical position.

Similarly, the seat can be articulated from the sitting vertical position to the in-bed lounge sitting position in a third step, and be articulated from the in-bed lounge sitting position to the sleeping horizontal position in a subsequent third step. In the third step, the coupling can be configured to articulate the legrest 16 and the lower seatback 22 simultaneously, from the legrest vertical position to the legrest horizontal position and from the lower seatback vertical position to the lower seatback horizontal position, while the headrest 26 is maintained in the contracted position and the upper seatback 24 is maintained in the upper seatback vertical position. In the subsequent fourth step, the coupling can be configured to articulate the upper seatback 24 and the headrest 26 simultaneously, from the upper seatback vertical position to the upper seatback horizontal position and from the headrest contracted position to the headrest extended position, while the lower seatback 22 is maintained in the lower seatback horizontal position and the legrest 16 is maintained in the legrest horizontal position.

In some implementations, convenience controls, such as those presented upon, may be presented to set the passenger seat in a selected position of the main (TTOL upright, in-bed lounge, and lie-flat) positions. The convenience controls, for example, may upon presented upon an armrest of the passenger seat to provide one or more wired control signals to the actuating system. In another example, a remote control may be provided for actuating the passenger seat via a wired or wireless signal. In a further example, convenience controls may be presented upon a touch screen interface for manipulating the position of the seat, Although described in relation to three convenience controls, in other examples, more or fewer main positions may be included such as, in some examples, a reclined position and/or a reclined position with raised foot rest. In a further example, a single control (e.g., "up" and "down" toggle button) may be supplied to articulate the seat between three or more main positions. Further, from any selected position, the passenger may be provided one or more controls configured to customize the present angles of the seat segments into a comfortable position. The controls, in some examples, can include seat back section toggle buttons similar to those presented for use with an automated vehicle seat. In another example, the user may have a touch screen interface to drag manipulate the positioning of portions of the passenger seat into a desired position. Other control mechanisms are possible.

Figure 28:
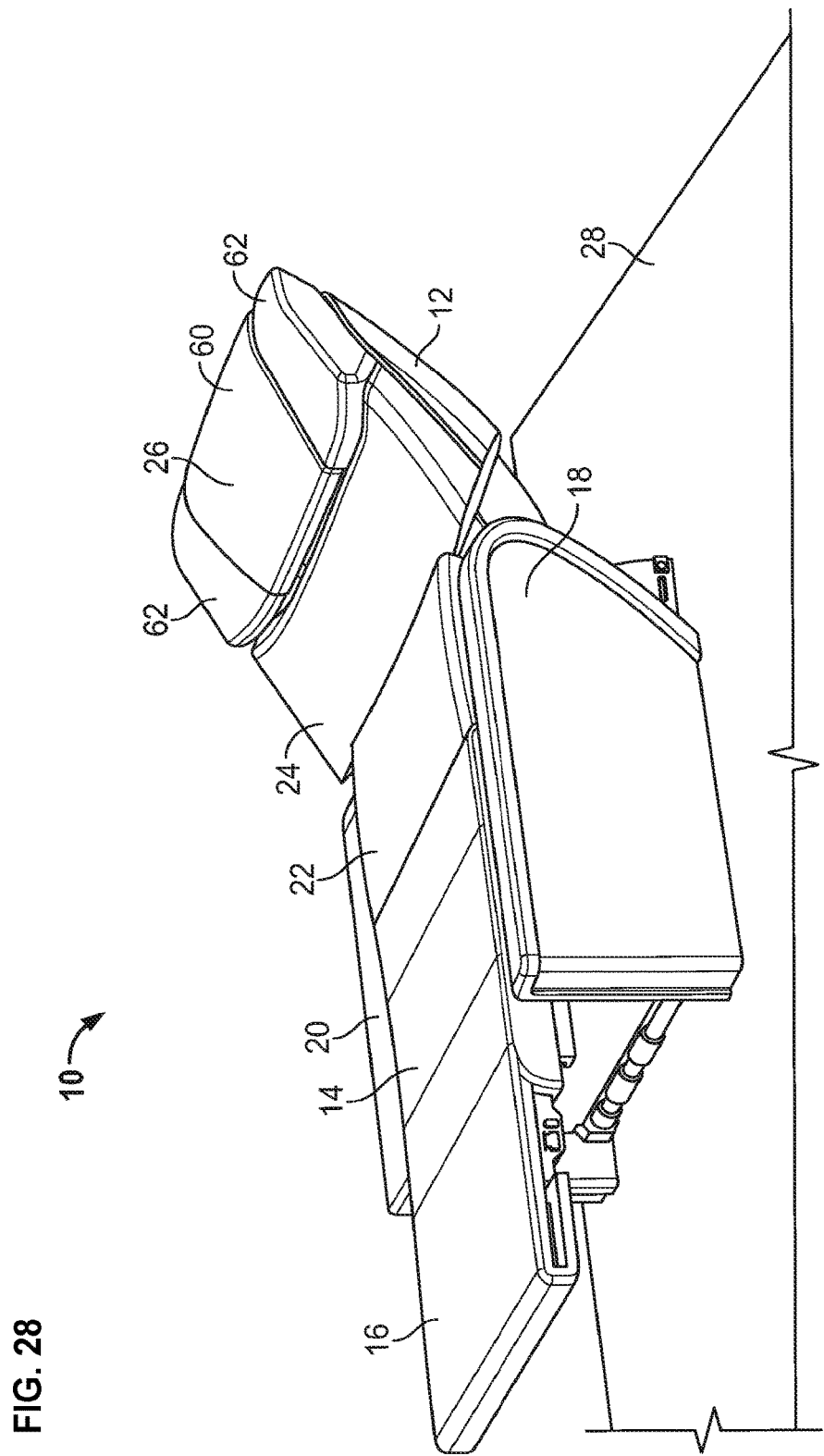
FIG. 28 is a front perspective view of an aircraft passenger seat with lateral portions of the headrest in an open position, according to certain aspects of the disclosure.
Figure 29:
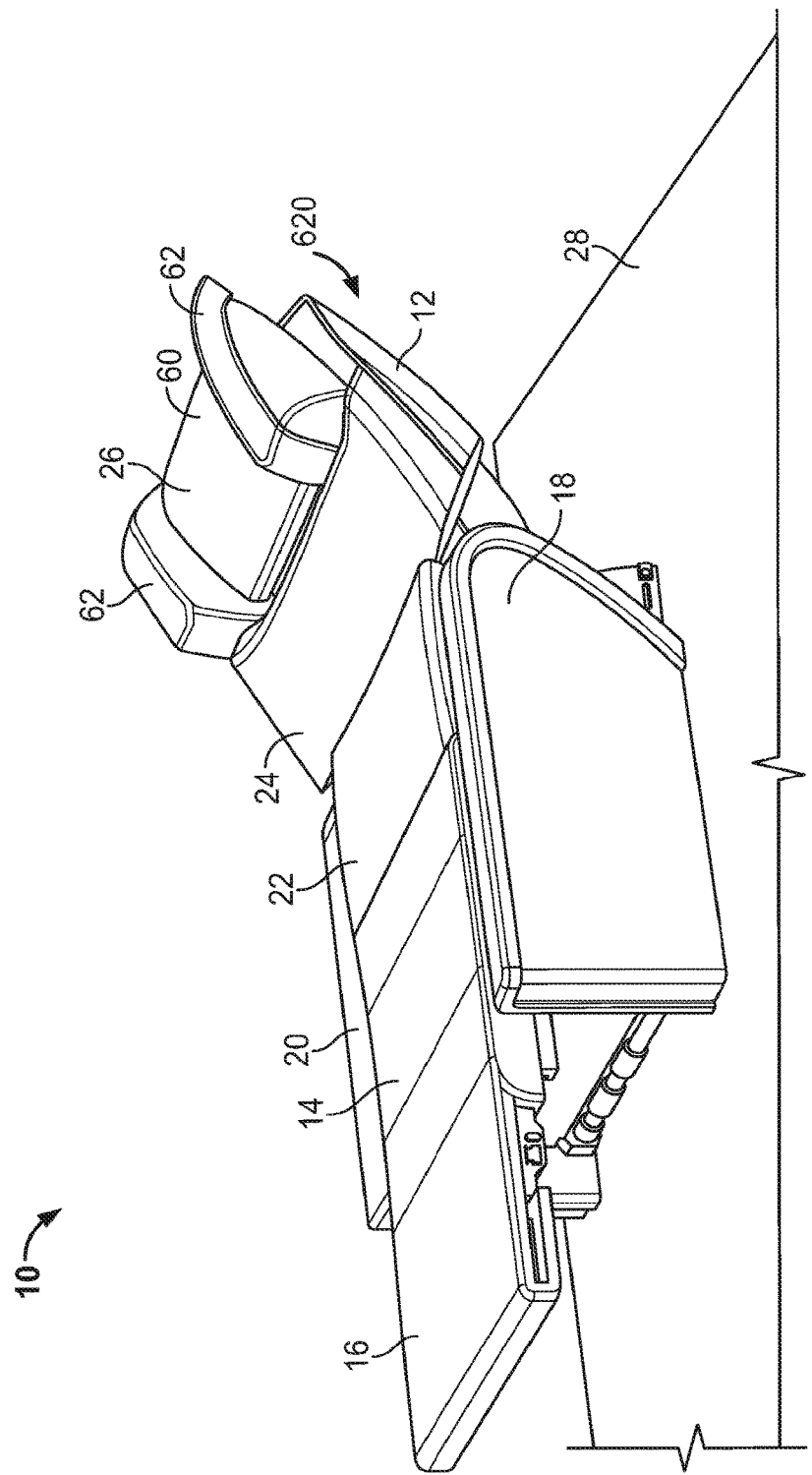
FIG. 29 is a front perspective view of an aircraft passenger seat with lateral portions of the headrest in a close position, according to certain aspects of the disclosure.
Figure 30:
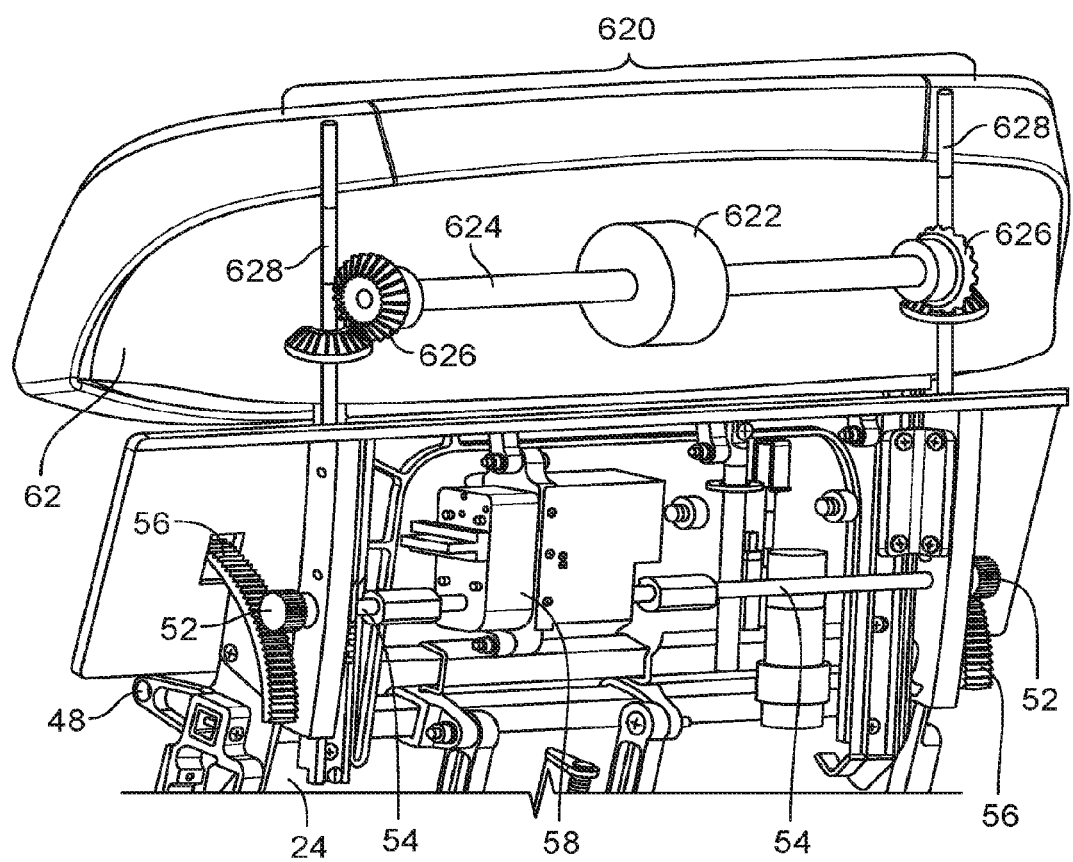
FIG. 30 is back perspective view of a headrest showing a lateral portion actuation system, according to certain aspects of the disclosure.

Now referring to FIGS. 28-30, in some implementations, the headrest 26 is segmented into a center portion 60 and side portions 62 that can be articulated from a closed position to an open position via a side portion actuation system 620. In the closed position, the side portions 62 are inclined with the center portion 60, while in the open position the side portions 62 are substantially aligned with the center portion. The articulation of the slide portions 62 from the closed position to the open position, and vice-versa can increase the comfort of a passenger using the seat 10. For example, the closed position can provide lateral support to a head of the passenger while the open position can provide a substantially flat surface to allow lateral motions of the head. Further, articulation of the head rest segments may provide some light blocking and/or privacy features. In a particular example, articulation of the aisle facing side portion 62 may block light from a handheld electronic device used by a passenger across the aisle.

As illustrated in FIG. 30, the side portion actuation system 620, in some embodiments, includes a side portion actuator 622, a shaft 624 driven by the side portion actuator 622, a pair of bevel gears 626 driven by the shaft 624, and a pair of pivots 628 rotatably connecting the side portions 62 to the center portion 60. For the articulation of the side portions 62 from the closed position to the open position, for example, the side portion actuator 620 can rotate the shaft 624 in clockwise direction to engage the pair of gear bevels 626 and contra-rotate the side portions 62 away from each other, via the pair of pivots 628. Conversely, for the articulation of the side portions 62 from the open position to the closed position, the side portion actuator 620 can rotate the shaft 624 in counter-clockwise direction to engage the pair of gear bevels 626 and contra-rotates the side portions 62 towards each other, via the pair of pivots 628. The articulation of the side portions 62 from the closed position to the open position, and vice-versa, in some implementations, is independent from the articulation of the headrest 26 from the headrest sitting position to the headrest sleeping position, and vice-versa, or from the articulation of the lower seatback 22 from the lower seatback vertical position to the lower seatback horizontal position, and/or from the articulation of the upper seatback 24 from the upper seatback vertical position to the upper seatback horizontal position so as to maximize the number of positions and adjustments available to the passenger between the upright sitting position and the horizontal sleeping position. Alternatively, the articulation of the side portions 62 from the closed position to the open position, and vice-versa, can be coupled with the articulation of the lower seatback 22 from the lower seatback vertical position to the lower seatback horizontal position, and/or from the articulation of the upper seatback 24 from the upper seatback vertical position to the upper seatback horizontal position so as to increase the comfort and convenience of a passenger using the seat 10.

Figure 31:
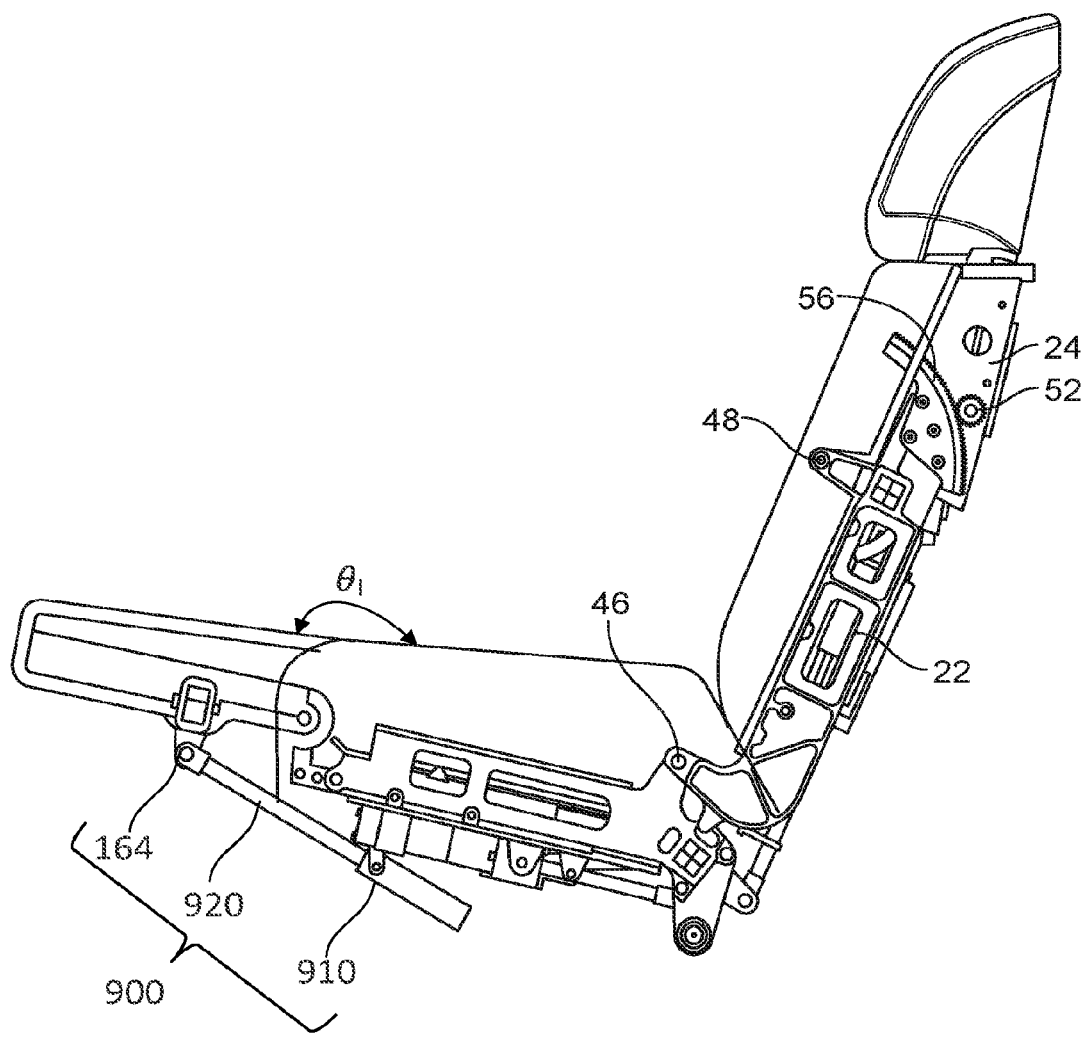
FIG. 31 is a front perspective view of an aircraft passenger seat showing a legrest actuation system, according to certain aspects of the disclosure.

Now referring to FIG. 31, in some embodiments, the legrest actuation system 900 can include a fourth electromechanical actuator 910 (e.g. a linear actuator, a stepper motor, a solenoid, etc.) and a legrest linkage 920 (e.g., a rod with clevis) that connects the fourth electromechanical actuator 910 to the legrest 16. For example, for articulating the legrest 16 from legrest vertical position to the legrest horizontal position, the fourth electromechanical actuator 910 can push the legrest linkage 920 in an upward forward direction to rotate the legrest 16 around a pivot axis 164 in a clockwise direction in order decrease the legrest angle $\theta_1$. For articulating the legrest 16 from legrest horizontal position to the legrest vertical position, the fourth electromechanical actuator 910 can pull the legrest linkage 920 in a downward aftward direction to rotate the legrest 16 around the pivot axis 164 in a counter-clockwise direction in order decrease the legrest angle $\theta_1$.

In some embodiments, the legrest 16 can include supplementary articulated sections to provide better comfort to the passenger. In one example, the supplementary articulated sections can be an upper legrest rotatably connected to the seat bottom 14 and a lower legrest rotatably connected to the upper legrest to better follow the anatomy of the legs of the passenger. The upper legrest can be articulated from an upper legrest vertical position to an upper legrest horizontal position, and vice-versa, while the lower legrest can be articulated from a lower legrest vertical position to a lower legrest horizontal position, and vice-versa. In the upper legrest vertical position the upper legrest is substantially aligned with a vertical plane while in the upper legrest horizontal position the upper legrest is substantially aligned with a horizontal plane. In the lower legrest vertical position, the lower legrest is substantially aligned with a vertical plane while in the lower legrest horizontal position the lower legrest is substantially aligned with a horizontal plane. The combination of the articulation of the upper legrest from the upper legrest vertical position to an upper legrest horizontal position, and vice-versa, and the articulation of the lower legrest from the lower legrest vertical position to the lower legrest horizontal position, and vice-versa, provides support when the knees of the passenger are bent.

In further embodiments, the supplementary articulated sections can include a first lateral legrest rotatably connected to the seat bottom 14 and a second lateral legrest adjacent to the first lateral legrest and rotatably connected to the seat bottom 14 to support independently each leg of the passenger. The first lateral legrest can be articulated from a first lateral legrest vertical position to a first lateral legrest horizontal position, and vice-versa, while the second lateral legrest can be articulated from a second lateral legrest vertical position to a second lateral horizontal position, and vice-versa. In the first lateral legrest vertical position, the upper legrest can be substantially aligned with a vertical plane and perpendicular with the seat bottom 14, while in the first lateral legrest horizontal position the first lateral legrest is substantially aligned with a horizontal plane and aligned with the seat bottom 14. In the second lateral legrest vertical position the second lateral legrest can be substantially aligned with a vertical plane and perpendicular with the seat bottom 14, while in the second lateral legrest horizontal position the second lateral legrest can be substantially aligned with a horizontal plane and aligned with the seat bottom 14. The independent articulation of the first lateral legrest and the second lateral legrest can provide an independent support for each leg of the passenger so as to increase the comfort of the passenger. This can include articulation mechanisms to provide positioning along a number of angles between the horizontal position and the vertical position. In some embodiments, articulation of each legrest segment may be achieved independently. In other embodiments, the legrest segments may articulate in unison to deploy into a number of positions between a horizontal position and a vertical position.

Figure 32:
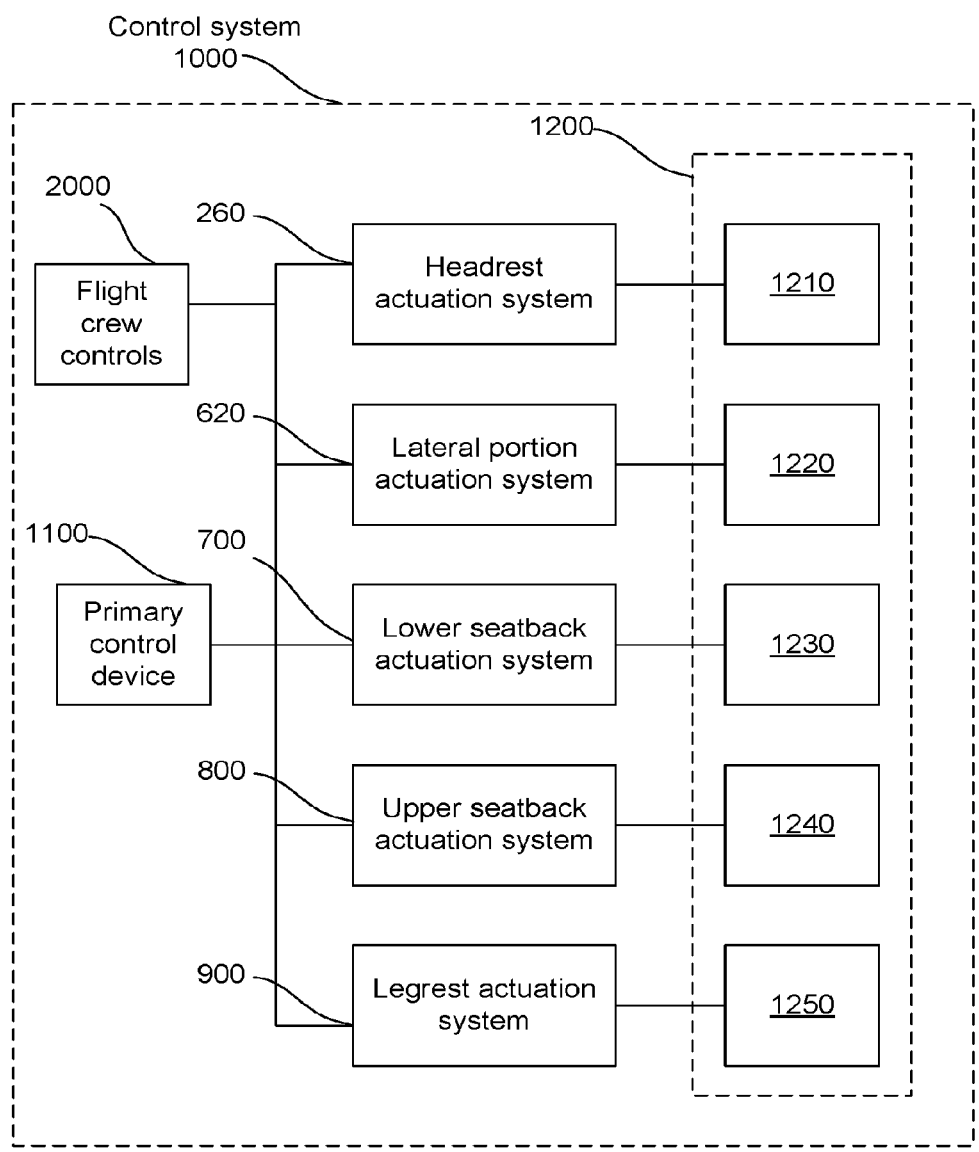
FIG. 32 a schematic view of a controls system, according to certain aspects of the disclosure.

Now, referring to FIG. 32, in some embodiments, a control system 1000 to articulate and adjust the seat 10 between the vertical sitting position and the horizontal sleeping position by the passenger, is illustrated.

For example, the control system 1000 can include a primary control device 1100 that controls a group of actuation systems of the seat 10 (e.g., the lower seatback actuation system 700, the upper seatback actuation system 800, the headset actuation system 260, the legrest actuation system 900, the middle seatback actuation system, and/or the series of actuation systems), and a number of secondary control devices 1200 that controls each actuation system of the seat 10 individually.

The primary control device 1100 can allow the passenger to couple and control together the group of actuation systems and adjust the seat 10 from the upright sitting position to the horizontal sleeping position, while the number of secondary control devices 1200 can allow the passenger to control independently each actuation system of the seat 10.

The primary control device 1100, in some implementations, provides to the passenger an articulation and an adjustment of the seat 10 under one single actuation though a single manipulation, e.g. press of a finger, while the secondary control device(s) 1200 provide to the passenger an individual articulation and adjustment of each elements of the seat 10, (e.g. the legrest 16, the headrest 26, the side portions 62, lower seatback 22, the upper seatback 24, the middle seatback 23, and/or the series of seatback sections 25).

For example, the primary control device 1100 can be configured to electrically connect the first electromechanical actuator 746, the second electromechanical actuator 50, the third electromechanical actuator 58, and the fourth electromechanical actuator 910 all together to couple the articulation of the lower seatback 22, the upper seatback 24, the articulation of the head rest 26, and the articulation of the legrest 16 together.

The passenger can articulate the seat 10 from the upright sitting position to the in-bed lounge sitting position, and vice-versa, from the upright sitting position to the horizontal sleeping position, and vice-versa, and from the in-bed lounge sitting position to the horizontal sleeping position, and vice-versa.

The primary control device 1100 and the number of secondary control devices 1200 can be electro-mechanical controls, e.g. push-button controls, or graphical user interface displayed on monitors and/or control panels, or the like.

In addition, the control system 1000 can be configured to be overridden and/or bypassed by flight crew controls 2000 to return the seat 10 to the required sitting position for TTOL.

Figure 33:
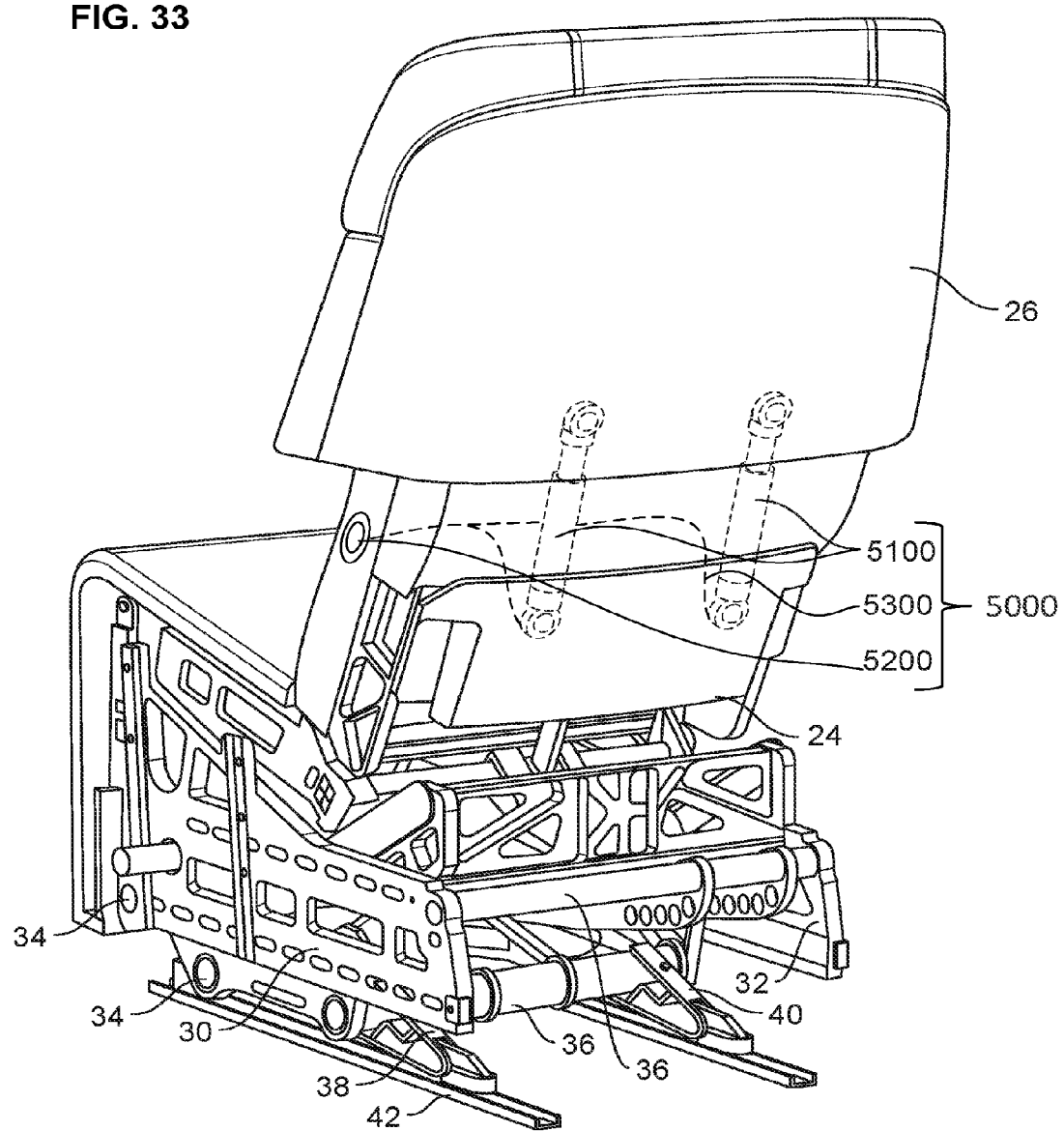
FIG. 33 is back perspective view of an aircraft passenger seat showing a manual actuation system, according to certain aspects of the disclosure.

Referring now to FIG. 33, in accordance with some implementations, a manual actuation system 5000 to articulate and control manually the seat 10 is illustrated. The manual actuation system 5000 can be configured to decrease energy consumption by limiting electrical power requirement as well as to increase operation robustness by preventing failures due to electric problems, e.g. short circuits, overheating, For example, the different elements of the seat 10, e.g. the lower seatback 22, the upper seatback 24, the headrest 26, the side portions 62, and/or the legrest 16, can be articulated and controlled manually instead of being articulated and controlled by electrically motorized actuators, e.g. the first electromechanical actuator 746, the second electromechanical actuator 50, the third electromechanical actuator 58, the side portion actuator 622, and/or the fourth electromechanical actuator 910. The first electromechanical actuator 746, the second electromechanical actuator 50, the third electromechanical actuator 58, the side portion actuator 622, and/or the fourth electromechanical actuator 910 can be replaced by a series of mechanical actuators 5100 operated by the passenger via manual actuators 5200, e.g. levels, knobs, handles, or the like. In some embodiments, the series of mechanical actuators 5100 can be any tensioner device having a locking function and an unlocking function to lock and to unlock a stroke of a rod that allows and prevent the articulation of the different elements of the seat 10. The mechanical actuators 5200, for example, may include locking gas springs. The locking and unlocking can be implemented at any desirable location along the articulation of the different elements of the seat 10 and where the locking and unlocking can be implement via a cabling system 5300 that can be pushed and pulled by the manual actuators 5200. For example, the mechanical actuators 2100 can be hydraulic tensioners where the locking function and the unlocking function are implemented through valves actuated by a release pin connected to the cabling system 5300 to disenable and enable hydraulic fluids to flow through a piston connected to the rod. The hydraulic fluids can be gases, e.g. air or nitrogen, fluids, e.g. mineral oils, synthetic oils, or water, or the combination of both. In this manner, rather than actuating between a first position and a second position, the adjustable passenger seat features may be adjustable along a number of incremental positions in a path between a first position and a second position.

In certain embodiments, the mechanical actuators 5100 can have an elastic locking function to provide better damping and comfort to a passenger. For the elastic locking function once the rod is locked at the desirable location the rod can be pushed and pull when a predetermined amount of force is applied to the rod. For example, the elastic locking function can be implemented via a floating piston placed around the rod to separate two different hydraulic fluid e.g. air and oil.

Furthermore, in some embodiments, the manual actuators 5200 can include a telescopic mechanism to extend the stroke course of the rod and increase the articulation and/or deployment of the different elements of the seat 10.

Figure 34:
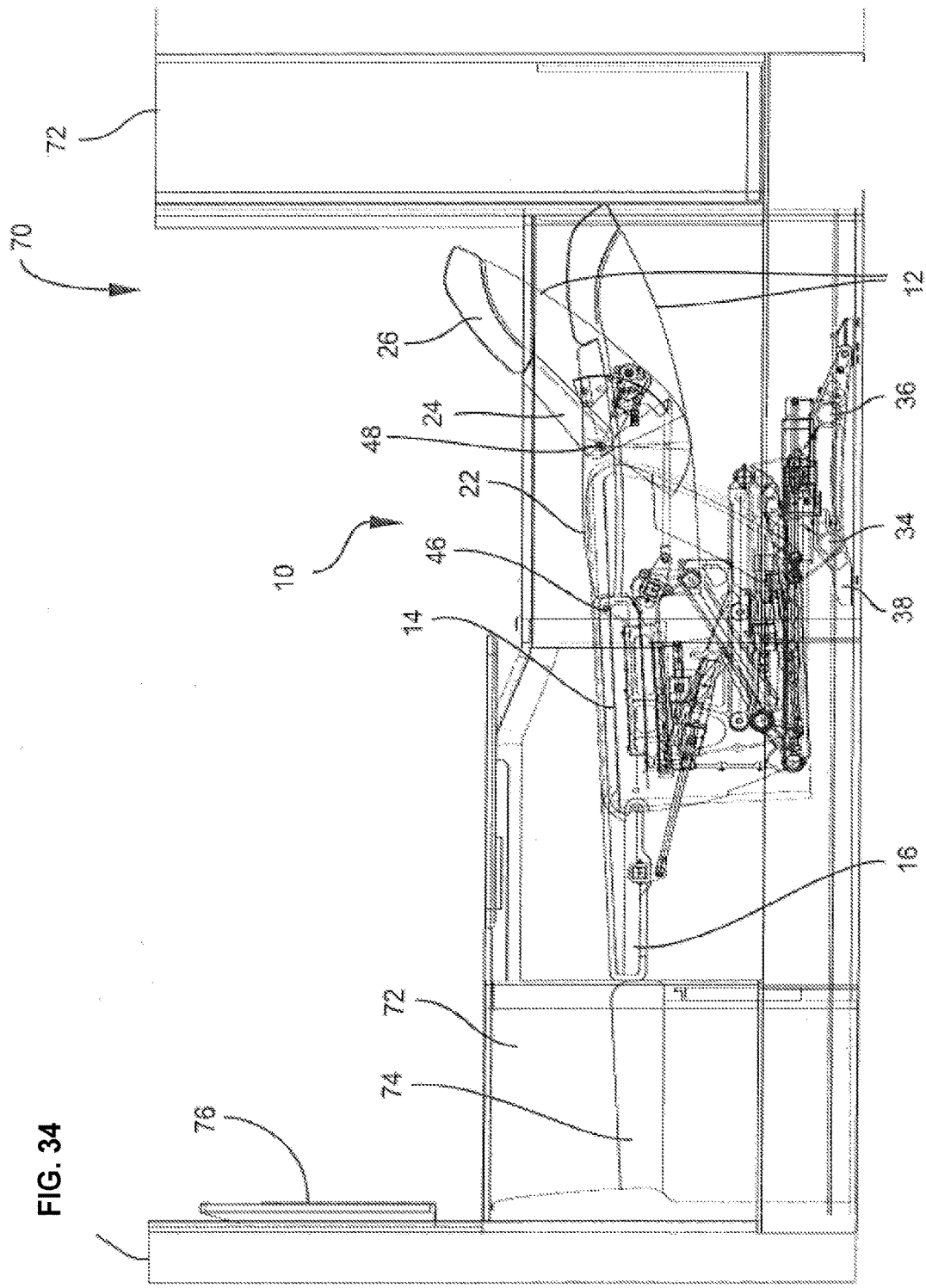
FIG. 34 is a side view showing an aircraft passenger seat positioned within a suite in premium seating class in an aircraft, according to certain aspects of the disclosure.

Referring to FIG. 34, an airline passenger seat 10 is shown installed within a suite 70. The primary seat frame members and seat actuators are shown for driving movement of the seatback 12, seat bottom 14, and legrest 16 to achieve the various sitting/sleeping positions described above. The actuators are preferably arranged beneath the seat bottom and along the backside of the seatback along with the associated cabling. Independent linear actuators, for example, may be provided for driving independent movement of the seat bottom 14 and legrest 16, in addition to the actuators discussed above in connection with the segmented seatback and headrest. Thus, the legrest 16 may be adjusted independent of seatback recline using a fourth actuator dedicated for legrest movement. In an alternative embodiment, the movement of the seatback 12, seat bottom 14, and legrest 16 may be coupled.

Suite 70, as illustrated, is defined by a number of privacy walls 72 that may be part of only one suite or shared walls between laterally and/or longitudinally adjacent suites. One of the walls may include an opening for aisle access. The suite 70 may include the seat 10 as described above, and additionally includes an ottoman 74 positioned directly forward of the seat 10. The ottoman 74, for example, may be spaced apart from the seat 10 such that space is provided between the front of the seat and the ottoman when the seat in upright, and cooperates with the legrest 16 when the legrest is fully deployed to extend the length of the bed. Thus, in the bed or in-bed lounge sitting positions, the top surface of the ottoman 74 lies in the same plane as the fully deployed legrest 16 and seat bottom 14. The suite 70 may further include a video monitor 76 positioned vertically above the ottoman 74 and directly forward of the seat 10 in order to be positioned at a comfortable viewing angle when the seat is in the upright, reclined or in-bed lounge sitting positions.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. An adjustable aircraft passenger seat comprising:
a seat bottom;
a legrest moveably connected to the seat bottom that articulates between a legrest vertical position and a legrest horizontal position via a legrest actuation system;
a lower seatback moveably connected to the seat bottom to be articulated between a lower seatback vertical position and a lower seatback horizontal position via a lower seatback actuation system;
an upper seatback moveably connected to the lower seatback to be articulated between an upper seatback vertical position and an upper seatback horizontal position via an upper seatback actuation system; and
a headrest connected to the upper seatback;
wherein the articulation of the legrest, the articulation of the lower seatback, and the articulation of the upper seatback, are configured to articulate the adjustable aircraft passenger seat from an upright sitting position to a horizontal sleeping position, through an in-bed lounge sitting position, wherein, in the in-bed lounge sitting position, an angle between the lower seatback and the seat bottom is greater than 90, the seat bottom is substantially horizontal and substantially planar with the legrest, and an angle of the upper seatback relative to the seat bottom is smaller than the angle between the lower seatback and the seat bottom such that a lower body of a passenger in the passenger seat would be in a lie flat position while an upper torso of the passenger would be in a raised position; and
wherein the legrest actuation system, the lower seatback actuation system, and the upper seatback actuation system are communicatively coupled to articulate the adjustable aircraft passenger seat from any of the upright sitting position, the in-bed lounge sitting position, and the horizontal sleeping position to any other of the upright sitting position, the in-bed lounge sitting position, and the horizontal sleeping position by way of a single passenger-operated control actuation.

2. The adjustable aircraft passenger seat of claim 1, wherein each of the legrest actuation system, the lower seatback actuation system, and the upper seatback actuation system is articulated via a respective electromechanical actuator.

3. The adjustable aircraft passenger seat of claim 2, wherein each of the electromechanical actuators is configured to be selectively coupled for simultaneous repositioning, wherein the coupling is performed by a primary control device that electrically connects the electromechanical actuators.

4. The adjustable aircraft passenger seat of claim 1, wherein the headrest is moveably connected to the upper seatback to be articulated between a contracted position and a deployed position.

5. The adjustable aircraft passenger seat of claim 4, wherein the articulation of the headrest follows at least one of a rectilinear course, a curvilinear course, and a circular course.

6. The adjustable aircraft passenger seat of claim 1, further including a middle seatback moveably connected to the lower seatback and to the upper seatback to be articulated from a middle seatback vertical position to a middle seatback horizontal position.

7. An aircraft passenger suite comprising:
a plurality of privacy walls defining boundaries of the passenger suite;
a passenger seat including
a seat bottom;
a legrest moveably connected to the seat bottom and configured to articulate between a legrest vertical position and a legrest horizontal position via a legrest actuation system;
a headrest; and
at least two seatback sections including a lower seatback section connected to the seat bottom and an upper seatback section connected to the headrest, wherein each seatback section of the at least two seatback sections is configured to be articulated between an upright seating position and a lie flat position via at least a lower seatback actuation system and an upper seatback actuation system;
wherein the articulation of the legrest and the articulation of the at least two seatback sections are configured to articulate to at least an upright sitting position, a horizontal sleeping position, and an in-bed lounge sitting position, wherein the in-bed lounge sitting position is characterized by a lie-flat lower body position and a raised upper body position; and
wherein the legrest actuation system, the lower seatback actuation system, and the upper seatback actuation system, are communicatively coupled to articulate the passenger seat from any of the upright sitting position, the in-bed lounge sitting position, and the horizontal sleeping position to any other of the upright sitting position, the in-bed lounge sitting position, and the horizontal sleeping position by way of a single passenger-operated control actuation.

8. The aircraft passenger suite of claim 7, further comprising an ottoman positioned directly forward of the passenger seat to form a substantially horizontal surface with the legrest when the legrest is in a horizontal position.

9. The aircraft passenger suite of claim 7, wherein the at least two seatback sections further comprise a middle seatback section moveably connected on a lower end to the lower seatback section and movably connected on an upper end to the upper seatback section.

10. The aircraft passenger suite of claim 7, wherein the at least two seatback sections comprise a series of at least five seatback sections having a spatial configuration to follow a general anatomy of a spine.

11. A method for providing multiple adjustable positions in an airplane passenger seat with a segmented seatback, comprising:
providing a first means for articulating a legrest of the airplane passenger seat, a second means for articulating a lower seatback segment of the airplane passenger seat, and a third means for articulating an upper seatback segment of the airplane passenger seat;
providing a means for coupling the first means for articulating, the second means for articulating, and the third means for articulating to enable simultaneous articulation of the legrest, the lower seatback segment, and the upper seatback segment; and
providing a means for controlling coupled articulation of the legrest, the lower seatback segment, and a upper seatback segment;
wherein the means for controlling is configured, upon input from a passenger of the airplane passenger seat, to cause actuation of the airplane passenger seat to one of at least three default positions, wherein the at least three default positions comprise an upright position, a lie-flat position, and an in-bed lounge position, wherein the in-bed lounge position is characterized by a lie-flat lower body position and a raised upper body position, and
wherein the means for controlling further comprises at least one passenger-actuable convenience control configured, upon selection, to cause actuation of the airplane passenger seat between the seat positions including the lie-flat position, the in-bed lounge position, and the upright position.

12. The method of claim 11, wherein at least one of the first means for articulating, the second means for articulating, and the third means for articulating comprises a linear actuator.

13. The method of claim 11, wherein the means for controlling comprises a coupler configured to couple signals to the first means for articulating, the second means for articulating, and the third means for articulating.

14. The method of claim 11, wherein the means for controlling comprises a set of user controls for individually customizing angles of the legrest, the lower seatback segment, and the upper seatback segment.

15. The method of claim 14, wherein the set of user controls provide infinitely adjustable positioning through signaling actuation of incremental angular steps of less than 5 degrees.

16. The method of claim 11, further comprising providing a fourth means for articulating a headrest moveably connected to the upper seatback segment.

* * * * *